United States Patent
Rakib et al.

(10) Patent No.: US 10,667,148 B1
(45) Date of Patent: *May 26, 2020

(54) METHODS OF OPERATING AND IMPLEMENTING WIRELESS COMMUNICATIONS SYSTEMS

(71) Applicant: Cohere Technologies, Inc., Santa Clara, CA (US)

(72) Inventors: Shlomo Selim Rakib, Saratoga, CA (US); Ronny Hadani, Austin, TX (US)

(73) Assignee: Cohere Technologies, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/041,781

(22) Filed: Jul. 21, 2018

Related U.S. Application Data

(63) Continuation-in-part of application No. 15/604,072, filed on May 24, 2017, now Pat. No. 10,034,184.
(Continued)

(51) Int. Cl.
  *H04W 24/02* (2009.01)
  *H04L 27/26* (2006.01)
  (Continued)

(52) U.S. Cl.
  CPC .......... *H04W 24/02* (2013.01); *H04L 5/0007* (2013.01); *H04L 5/0023* (2013.01);
  (Continued)

(58) Field of Classification Search
  CPC ....... H04L 25/03057; H04L 2025/0349; H04L 2025/03617; H04L 25/03; H04L 25/03828;
  (Continued)

(56) References Cited

U.S. PATENT DOCUMENTS

| 4,754,493 A | 6/1988 | Coates |
| 5,083,135 A | 1/1992 | Nagy et al. |

(Continued)

FOREIGN PATENT DOCUMENTS

| CN | 1235720 A | 11/1999 |
| CN | 101682316 A | 3/2010 |

(Continued)

OTHER PUBLICATIONS

Office Action for U.S. Appl. No. 13/117,119, dated Aug. 5, 2013, 5 pages.
(Continued)

*Primary Examiner* — Benjamin H Elliott, IV
(74) *Attorney, Agent, or Firm* — Perkins Coie LLP

(57) ABSTRACT

Computerized wireless transmitter/receiver system that automatically uses combinations of various methods, including transmitting data symbols by weighing or modulating a family of time shifted and frequency shifted waveforms bursts, pilot symbol methods, error detection methods, MIMO methods, and other methods, to automatically determine the structure of a data channel, and automatically compensate for signal distortions caused by various structural aspects of the data channel, as well as changes in channel structure. Often the data channel is a two or three dimensional space in which various wireless transmitters, receivers and signal reflectors are moving. The invention's modulation methods detect locations and speeds of various reflectors and other channel impairments. Error detection schemes, variation of modulation methods, and MIMO techniques further detect and compensate for impairments. The invention can automatically optimize its operational parameters, and produce a deterministic non-fading signal in environments in which other methods would likely degrade.

12 Claims, 7 Drawing Sheets

Related U.S. Application Data which is a continuation of application No. 14/805,407, filed on Jul. 21, 2015, now Pat. No. 9,668,148, which is a continuation-in-part of application No. 14/583,911, filed on Dec. 29, 2014, now Pat. No. 9,444,514, and a continuation-in-part of application No. 14/341,820, filed on Jul. 27, 2014, now Pat. No. 9,083,483, which is a continuation of application No. 13/117,119, filed on May 26, 2011, now Pat. No. 8,879,378, said application No. 14/583,911 is a continuation-in-part of application No. 13/430,690, filed on Mar. 27, 2012, now Pat. No. 9,083,595, and a continuation-in-part of application No. 13/117,119, filed on May 26, 2011, now Pat. No. 8,879,378, and a continuation-in-part of application No. 13/927,091, filed on Jun. 25, 2013, now Pat. No. 9,130,638, said application No. 16/041,781 is a continuation-in-part of application No. 15/485,101, filed on Apr. 11, 2017, now Pat. No. 10,064,074, which is a continuation of application No. 14/805,400, filed on Jul. 21, 2015, now Pat. No. 9,634,719.

(60) Provisional application No. 62/027,231, filed on Jul. 21, 2014, provisional application No. 61/349,619, filed on May 28, 2010, provisional application No. 61/615,884, filed on Mar. 26, 2012, provisional application No. 61/664,020, filed on Jun. 25, 2012.

(51) Int. Cl.
*H04L 5/00* (2006.01)
*H04L 25/02* (2006.01)
*H04W 72/08* (2009.01)
*H04B 7/10* (2017.01)

(52) U.S. Cl.
CPC .......... *H04L 5/0048* (2013.01); *H04L 25/022* (2013.01); *H04L 25/0224* (2013.01); *H04L 27/2613* (2013.01); *H04L 27/2639* (2013.01); *H04W 72/08* (2013.01); *H04B 7/10* (2013.01)

(58) Field of Classification Search
CPC ....... H04L 25/03847; H04B 3/20; H04B 3/23; H04B 7/015; H04B 10/071; H04B 1/76; H04B 3/10

See application file for complete search history.

(56) References Cited

U.S. PATENT DOCUMENTS

| | | | |
|---|---|---|---|
| 5,182,642 A | 1/1993 | Gersdorff et al. | |
| 5,623,511 A | 4/1997 | Bar-David et al. | |
| 5,831,977 A | 11/1998 | Dent | |
| 5,872,542 A | 2/1999 | Simons et al. | |
| 5,956,624 A | 9/1999 | Hunsinger et al. | |
| 6,212,246 B1 | 4/2001 | Hendrickson | |
| 6,289,063 B1 | 9/2001 | Duxbury | |
| 6,356,555 B1 | 3/2002 | Rakib et al. | |
| 6,388,621 B1 | 5/2002 | Lynch | |
| 6,426,983 B1 | 7/2002 | Rakib et al. | |
| 6,608,864 B1 | 8/2003 | Strait | |
| 6,631,168 B2 | 10/2003 | Izumi | |
| 6,704,366 B1 | 3/2004 | Combes et al. | |
| 6,956,814 B1 | 10/2005 | Campanella | |
| 7,010,048 B1 | 3/2006 | Shattil | |
| 7,327,812 B2 | 2/2008 | Auer | |
| 7,392,018 B1 | 6/2008 | Ebert et al. | |
| 7,689,049 B2 | 3/2010 | Monro | |
| 7,773,685 B2 | 8/2010 | Tirkkonen et al. | |
| 7,864,877 B2 | 1/2011 | Hottinen | |
| 8,081,105 B2 * | 12/2011 | Tigrek ................ | G01S 13/28 342/104 |
| 8,229,017 B1 | 7/2012 | Lee et al. | |
| 8,259,845 B2 | 9/2012 | Dent | |
| 8,401,131 B2 | 3/2013 | Fety et al. | |
| 8,547,988 B2 | 10/2013 | Hadani et al. | |
| 8,619,892 B2 | 12/2013 | Vetter et al. | |
| 8,717,210 B2 | 5/2014 | Eldar et al. | |
| 8,879,378 B2 | 11/2014 | Rakib et al. | |
| 8,892,048 B1 | 11/2014 | Turner | |
| 8,976,851 B2 | 3/2015 | Hadani et al. | |
| 9,031,141 B2 | 5/2015 | Hadani et al. | |
| 9,071,285 B2 | 6/2015 | Hadani et al. | |
| 9,071,286 B2 | 6/2015 | Hadani et al. | |
| 9,083,483 B1 * | 7/2015 | Rakib ................ | H04L 5/0016 |
| 9,083,595 B2 | 7/2015 | Rakib et al. | |
| 9,130,638 B2 | 9/2015 | Hadani et al. | |
| 9,282,528 B2 | 3/2016 | Hashimoto | |
| 9,294,315 B2 | 3/2016 | Hadani et al. | |
| 9,444,514 B2 * | 9/2016 | Hadani ................ | H04L 5/0048 |
| 9,548,840 B2 | 1/2017 | Hadani et al. | |
| 9,553,984 B2 | 1/2017 | Krause et al. | |
| 9,590,779 B2 | 3/2017 | Hadani et al. | |
| 9,634,719 B2 * | 4/2017 | Rakib ................ | H04L 5/0048 |
| 9,660,851 B2 | 5/2017 | Hadani et al. | |
| 9,668,148 B2 * | 5/2017 | Hadani ................ | H04L 25/022 |
| 9,712,354 B2 | 7/2017 | Hadani et al. | |
| 9,729,281 B2 | 8/2017 | Hadani et al. | |
| 9,867,065 B2 * | 1/2018 | Hadani ................ | H04L 5/0048 |
| 10,034,184 B2 * | 7/2018 | Hadani ................ | H04L 25/022 |
| 10,064,074 B1 * | 8/2018 | Rakib ................ | H04L 5/0048 |
| 10,334,457 B2 * | 6/2019 | Hadani ................ | H04L 5/0048 |
| 2001/0031022 A1 | 10/2001 | Petrus et al. | |
| 2001/0033614 A1 | 10/2001 | Hudson | |
| 2001/0046205 A1 | 11/2001 | Easton et al. | |
| 2002/0001308 A1 | 1/2002 | Heuer | |
| 2002/0034191 A1 | 3/2002 | Shattil | |
| 2002/0181388 A1 | 12/2002 | Jain et al. | |
| 2002/0181390 A1 | 12/2002 | Mody et al. | |
| 2002/0181607 A1 | 12/2002 | Izumi | |
| 2003/0073464 A1 | 4/2003 | Giannakis et al. | |
| 2003/0185295 A1 | 10/2003 | Yousef | |
| 2003/0235147 A1 | 12/2003 | Walton et al. | |
| 2004/0044715 A1 | 3/2004 | Aldroubi et al. | |
| 2004/0174812 A1 | 9/2004 | Murakami et al. | |
| 2004/0189581 A1 | 9/2004 | Sako et al. | |
| 2004/0218523 A1 | 11/2004 | Varshney et al. | |
| 2005/0157778 A1 | 7/2005 | Trachewsket et al. | |
| 2005/0157820 A1 | 7/2005 | Wongwirawat et al. | |
| 2005/0180517 A1 | 8/2005 | Abe | |
| 2005/0207334 A1 * | 9/2005 | Hadad ................ | H04L 25/022 370/203 |
| 2005/0251844 A1 | 11/2005 | Martone et al. | |
| 2006/0008021 A1 | 1/2006 | Bonnet | |
| 2006/0039270 A1 | 2/2006 | Strohmer et al. | |
| 2007/0014272 A1 | 1/2007 | Palanki et al. | |
| 2007/0038691 A1 | 2/2007 | Candes et al. | |
| 2007/0078661 A1 | 4/2007 | Sriram et al. | |
| 2007/0104283 A1 | 5/2007 | Han et al. | |
| 2007/0110131 A1 | 5/2007 | Guess et al. | |
| 2007/0211952 A1 | 9/2007 | Faber et al. | |
| 2007/0237181 A1 | 10/2007 | Cho et al. | |
| 2007/0253465 A1 | 11/2007 | Muharemovic et al. | |
| 2007/0253504 A1 | 11/2007 | Hasegawa | |
| 2008/0043857 A1 | 2/2008 | Dias et al. | |
| 2008/0117999 A1 | 5/2008 | Kadous et al. | |
| 2008/0186843 A1 | 8/2008 | Ma et al. | |
| 2008/0187062 A1 | 8/2008 | Pan et al. | |
| 2008/0232504 A1 | 9/2008 | Ma et al. | |
| 2008/0310383 A1 | 12/2008 | Kowalski | |
| 2009/0080403 A1 | 3/2009 | Hamdi | |
| 2009/0092259 A1 | 4/2009 | Jot et al. | |
| 2009/0103593 A1 | 4/2009 | Bergamo | |
| 2009/0122854 A1 | 5/2009 | Zhu et al. | |
| 2009/0161804 A1 | 6/2009 | Chrabieh et al. | |
| 2009/0204627 A1 | 8/2009 | Hadani | |
| 2009/0222226 A1 | 9/2009 | Baraniuk et al. | |
| 2009/0303961 A1 | 12/2009 | Popovic et al. | |
| 2010/0001901 A1 | 1/2010 | Baraniuk et al. | |
| 2010/0008432 A1 | 1/2010 | Kim et al. | |
| 2010/0027608 A1 | 2/2010 | Priotti | |

(56) References Cited

U.S. PATENT DOCUMENTS

| | | |
|---|---|---|
| 2010/0111138 A1 | 5/2010 | Hosur et al. |
| 2010/0142476 A1 | 6/2010 | Jiang et al. |
| 2010/0187914 A1 | 7/2010 | Rada et al. |
| 2010/0238787 A1 | 9/2010 | Guey |
| 2010/0277308 A1 | 11/2010 | Potkonjak |
| 2010/0303136 A1 | 12/2010 | Ashikhmin et al. |
| 2010/0322349 A1 | 12/2010 | Lee et al. |
| 2011/0007789 A1* | 1/2011 | Garmany .............. H04L 25/022 375/224 |
| 2011/0110532 A1 | 5/2011 | Svendsen |
| 2011/0116489 A1 | 5/2011 | Grandhi |
| 2011/0116516 A1* | 5/2011 | Hwang ............. H04W 72/0406 370/480 |
| 2011/0126071 A1 | 5/2011 | Han et al. |
| 2011/0131463 A1 | 6/2011 | Gunnam |
| 2011/0216808 A1 | 9/2011 | Tong et al. |
| 2011/0286502 A1 | 11/2011 | Adachi et al. |
| 2011/0287778 A1 | 11/2011 | Levin et al. |
| 2011/0292971 A1 | 12/2011 | Hadani et al. |
| 2011/0293030 A1* | 12/2011 | Rakib ................... H04L 5/0016 375/267 |
| 2011/0299379 A1 | 12/2011 | Sesia et al. |
| 2011/0305267 A1 | 12/2011 | Rius et al. |
| 2012/0021769 A1 | 1/2012 | Lindoff et al. |
| 2012/0051457 A1 | 3/2012 | Ma et al. |
| 2012/0140716 A1 | 6/2012 | Baldemair et al. |
| 2012/0170684 A1 | 7/2012 | Yim et al. |
| 2012/0201322 A1* | 8/2012 | Rakib ................... H04L 5/0016 375/285 |
| 2012/0213098 A1 | 8/2012 | Sun |
| 2012/0235795 A1 | 9/2012 | Liao et al. |
| 2012/0269201 A1 | 10/2012 | Atungsiri et al. |
| 2012/0272117 A1 | 10/2012 | Stadelmeier et al. |
| 2012/0320994 A1 | 12/2012 | Loghin et al. |
| 2013/0021977 A1 | 1/2013 | Yang et al. |
| 2013/0058390 A1 | 3/2013 | Haas et al. |
| 2013/0077579 A1 | 3/2013 | Cho et al. |
| 2013/0083661 A1 | 4/2013 | Gupta et al. |
| 2013/0121497 A1 | 5/2013 | Smaragdis et al. |
| 2013/0230010 A1 | 9/2013 | Kim et al. |
| 2013/0260787 A1 | 10/2013 | Hashimoto |
| 2013/0279627 A1 | 10/2013 | Wu et al. |
| 2013/0315133 A1 | 11/2013 | Wang et al. |
| 2014/0143639 A1 | 5/2014 | Loghin et al. |
| 2014/0161154 A1 | 6/2014 | Hadani et al. |
| 2014/0169385 A1 | 6/2014 | Hadani et al. |
| 2014/0169406 A1 | 6/2014 | Hadani et al. |
| 2014/0169433 A1 | 6/2014 | Hadani et al. |
| 2014/0169436 A1 | 6/2014 | Hadani et al. |
| 2014/0169437 A1 | 6/2014 | Hadani et al. |
| 2014/0169441 A1* | 6/2014 | Hadani ................ H04B 1/1027 375/233 |
| 2014/0247803 A1 | 9/2014 | Arambepola et al. |
| 2014/0348252 A1 | 11/2014 | Siohan et al. |
| 2014/0364128 A1 | 12/2014 | Lee et al. |
| 2015/0117395 A1* | 4/2015 | Hadani ................ H04L 5/0048 370/330 |
| 2015/0326273 A1* | 11/2015 | Rakib ................... H04L 5/0048 375/131 |
| 2015/0327085 A1* | 11/2015 | Hadani ................ H04L 25/022 370/252 |
| 2015/0382231 A1 | 12/2015 | Jabbar et al. |
| 2016/0043835 A1 | 2/2016 | Hadani et al. |
| 2016/0135132 A1 | 5/2016 | Donepudi et al. |
| 2016/0182269 A1 | 6/2016 | Hadani et al. |
| 2016/0191217 A1 | 6/2016 | Hadani et al. |
| 2016/0191280 A1 | 6/2016 | Hadani et al. |
| 2016/0254889 A1 | 9/2016 | Shattil |
| 2016/0277225 A1 | 9/2016 | Frenne et al. |
| 2016/0309345 A1 | 10/2016 | Tehrani et al. |
| 2016/0380743 A1 | 12/2016 | Rakib |
| 2016/0381576 A1 | 12/2016 | Hadani et al. |
| 2017/0012749 A1 | 1/2017 | Rakib et al. |
| 2017/0012810 A1 | 1/2017 | Rakib et al. |
| 2017/0019297 A1 | 1/2017 | Rakib |
| 2017/0033899 A1 | 2/2017 | Rakib et al. |
| 2017/0040711 A1 | 2/2017 | Rakib et al. |
| 2017/0078054 A1 | 3/2017 | Hadani et al. |
| 2017/0099122 A1 | 4/2017 | Hadani et al. |
| 2017/0099607 A1 | 4/2017 | Hadani et al. |
| 2017/0149594 A1 | 5/2017 | Rakib |
| 2017/0149595 A1 | 5/2017 | Rakib et al. |
| 2017/0201354 A1 | 7/2017 | Hadani et al. |
| 2017/0207817 A1 | 7/2017 | Hadani et al. |
| 2017/0222700 A1 | 8/2017 | Hadani et al. |
| 2017/0230215 A1 | 8/2017 | Rakib et al. |
| 2017/0244524 A1 | 8/2017 | Hadani et al. |
| 2017/0303146 A1* | 10/2017 | Hadani ................ H04L 25/022 |

FOREIGN PATENT DOCUMENTS

| | | |
|---|---|---|
| CN | 101939935 A | 1/2011 |
| EP | 1432168 A1 | 6/2004 |
| JP | 2011127910 | 6/2011 |
| WO | 2007004297 | 1/2007 |
| WO | 2011137699 A1 | 11/2011 |
| WO | 2011150315 | 12/2011 |
| WO | 2013148546 | 10/2013 |
| WO | 2014004585 | 1/2014 |
| WO | 2016014596 | 1/2016 |
| WO | 2016014598 | 1/2016 |
| WO | 2016176642 | 11/2016 |
| WO | 2016183230 | 11/2016 |
| WO | 2016183240 | 11/2016 |
| WO | 2016209848 | 12/2016 |
| WO | 2017003952 | 1/2017 |
| WO | 2017011478 | 1/2017 |

OTHER PUBLICATIONS

Notice of Allowance for U.S. Appl. No. 13/117,119, dated Feb. 28, 2014, 13 pages.
Banelli, P. et al., "Modulation Formats and Waveforms for 5G Networks: Who Will Be the Heir of OFDM?," IEEE Signal Processing Magazine, vol. 81, pp. 80-93, Nov. 2014.
El Hattachi, R. et al., "NGMN 5G Initiative White Paper," NGMN Alliance, Feb. 17 2015. [Online]. Available: https://www.ngmn.org/uploads/media/NGMN_5G_White_Paper_V1_0.pdf, 125 pages.
Rusek, F. et al., "Scaling Up MIMO, Opportunities and Challenges with Very Large Arrays," IEEE Signal Processing Magazine, pp. 40-60 (2013).
Vodafone, "Cellular Internet of Things: Architectural Aspects," RP-150869, 3GPP RAN#68, Malmo, Sweden (Jun. 9, 2015), 19 pages.
Supplementary European Search Report for European Application No. 11787483.4, dated Sep. 9, 2014, 6 pages.
International Search Report and Written Opinion for International Application No. PCT/US2011/038302, dated Nov. 15, 2011, 8 pages.
International Preliminary Report on Patentability for International Application No. PCT/US2011/038302, dated Dec. 4, 2012, 7 pages.
Office Action for U.S. Appl. No. 13/117,124, dated Feb. 22, 2013, 7 pages.
Notice of Allowance for U.S. Appl. No. 13/117,124, dated Aug. 8, 2013, 10 pages.
Office Action for U.S. Appl. No. 14/605,957, dated Jun. 22, 2017, 6 pages.
Supplementary European Search Report for European Application No. 13809004.8, dated Apr. 14, 2016, 8 pages.
communication Pursuant to Article 94(3) Epc for European Application No. 13809004.8, dated Feb. 17, 2017, 5 pages.
Notice of Allowance for U.S. Appl. No. 13/927,087, dated Feb. 25, 2015, 9 pages.
Office Action for U.S. Appl. No. 13/927,087, dated Nov. 12, 2014, 14 pages.
Gurevich, S. et al. "Group Representation Design of Digital Signals and Sequences," S.W. Golomb et al. (eds.), SETA 2008, LNCS 5203, pp. 153-166, Springer-Verlag Berlin Heidelberg (2008).

(56) References Cited

OTHER PUBLICATIONS

International Search Report and Written Opinion for International Application No. PCT/US2013/047723, dated Oct. 29, 2013, 17 pages.
International Preliminary Report on Patentability for International Application No. PCT/US2013/047723, dated Dec. 31, 2014, 15 pages.
Notice of Allowance for U.S. Appl. No. 13/927,088, dated Feb. 18, 2015, 7 pages.
Office Action for U.S. Appl. No. 13/927,088, dated Nov. 28, 2014, 13 pages.
Notice of Allowance for U.S. Appl. No. 13/927,086, dated Dec. 26, 2014, 8 pages.
Supplemental Notice of Allowability for U.S. Appl. No. 13/927,086, dated Mar. 19, 2015, 4 pages.
Office Action for U.S. Appl. No. 13/927,086, dated Oct. 14, 2014, 10 pages.
Office Action for U.S. Appl. No. 13/927,089, dated Dec. 24, 2014, 13 pages.
Office Action for U.S. Appl. No. 13/927,089, dated Aug. 14, 2015, 7 pages.
Supplemental Notice of Allowability for U.S. Appl. No. 13/927,091, dated Jun. 11, 2015, 4 pages.
Notice of Allowance for U.S. Appl. No. 13/927,091, dated Apr. 24, 2015, 8 pages.
Office Action for U.S. Appl. No. 13/927,091, dated Jan. 27, 2015, 15 pages.
Office Action for U.S. Appl. No. 13/927,092, dated Oct. 8, 2014, 5 pages.
Notice of Allowance for U.S. Appl. No. 13/927,092, dated Oct. 24, 2014, 7 pages.
Office Action for U.S. Appl. No. 13/927,095, dated Apr. 30, 2015, 11 pages.
Office Action for U.S. Appl. No. 13/927,095, dated Nov. 4, 2015, 9 pages.
Office Action for U.S. Appl. No. 13/927,095, dated Jun. 1, 2016, 10 pages.
Office Action for U.S. Appl. No. 14/717,886, dated Apr. 19, 2016, 10 pages.
Office Action for U.S. Appl. No. 14/709,377, dated Dec. 11, 2015, 12 pages.
Office Action for U.S. Appl. No. 14/709,377, dated Jul. 13, 2016, 17 pages.
Examination Report No. 1 for Australian Application No. 2013239970, dated Dec. 8, 2015, 3 pp.
"AT&T Annual Report 2014," Opening Our Network [Online]. Retrieved from the Internet: Sep. 22, 2016. <Url: http://www.att_com/Investor/ATT_Annual/2014/aUntroduces_new_concepts_for_telecom_network_html>, 5 pages.
CATT, "UL ACK/NACK transmission methods for Lte-A," 3GPP TSG RAN WG1 Meeting #60bis, R1-102453, Beijing, China, Apr. 12-16, 2010, 8 pages.
Toskala, a. et al., "Physical Layer," Chapter 5 in: "LTE for UMTS: OFDMA and SC-FDMA Based Radio Access," Holma, H. et al. (eds.), John Wiley & Sons, Ltd., United Kingdom, 2009, pp. 83-135.
Mecklenbrauker, W., "A Tutorial on Non-Parametric Bilinear Time-Frequency Signal Representations," in: Time and Frequency Representation of Signals and Systems, Longo, G. et al. (eds.), Springer-Verlag Wien, vol. 309, pp. 11-68 (1989).
Nehorai, a. et al., "Muri: Adaptive waveform design for full spectral dominance (2005-2010)," AFOSR FA9550-05-1-0443, Final Report, [online], Mar. 11, 2011 Retrieved on May 11, 2013, Retrieved from the Internet <URL: http://oai.dtic.mil/oai/oai?verb=getRecord&metadataPrefix=html&identifier=ADA565420>, 103 pages.
Office Action for Japanese Application No. 2015-518647, dated Jul. 7, 2015, 10 pages.
Office Action for U.S. Application No. 14/754,596, dated Apr. 19, 2016, 18 pages.
Office Action for U.S. Application No. 14/809,129, dated Jul. 19, 2016, 5 pages.
Office Action for U.S. Application No. 15/617,962, dated Sep. 6, 2017, 10 pages.
International Search Report and Written Opinion for International Application No. PCT/US2016/050825, dated Feb. 8, 2017, 12 pages.
International Search Report and Written Opinion for International Application No. PCT/US2016/052524, dated Dec. 20, 2016, 8 pages.
Office Action for U.S. Application No. 15/374,995, dated Aug. 7, 2017, 6 pages.
International Search Report and Written Opinion for International Application No. PCTIUS2017/025797, dated Jun. 21, 2017, 6 pages.
International Search Report and Written Opinion for International Application No. PCT/US2016/030259, dated Aug. 1, 2016, 13 pages.
Office Action for U.S. Appl. No. 15/152,464, dated Apr. 6, 2017, 10 pages.
Examination Report No. 1 for Australian Application No. 2013280487, dated May 2, 2016, 3 pages.
International Search Report and Written Opinion for International Application No. PCT/US2016/031928, dated Oct. 7, 2016, 10 pages.
Office Action for U.S. Appl. No. 15/188,946, dated May 8, 2017, 14 pages.
International Search Report and Written Opinion for International Application No. PCT/US2016/038584, dated Sep. 26, 2016, 8 pages.
Office Action for U.S. Appl. No. 15/187,668, dated Feb. 16, 2017, 6 pages.
International Search Report and Written Opinion for International Application No. PCT/US2016/031909, dated Aug. 11, 2016, 13 pages.
Office Action for U.S. Appl. No. 15/194,494, dated May 5, 2017, 16 pages.
International Search Report and Written Opinion for International Application No. PCT/US2016/039662, dated Nov. 29, 2016, 14 pages.
Office Action for U.S. Appl. No. 15/436,653, dated Jun. 2, 2017, 10 pages.
Office Action for U.S. Appl. No. 15/208,545, dated Aug. 21, 2017, 15 pages.
International Search Report and Written Opinion for International Application No. PCT/US2016/041940, dated Oct. 20, 2016, 8 pages.
Supplementary European Search Report for European Application No. 13768150.8, dated Oct. 30, 2015, 7 pages.
International Search Report and Written Opinion for International Application No. PCT/US2013/033652, dated Jun. 12, 2013, 8 pages.
International Search Report and Written Opinion for International Application No. PCT/US2015/041417, dated Oct. 1, 2015, 7 pages.
Office Action for U.S. Appl. No. 14/805,407, dated Dec. 14, 2016, 7 pages.
International Search Report and Written Opinion for International Application No. PCT/US2015/041420, dated Oct. 1, 2015, 6 pages.

* cited by examiner

METHODS OF OPERATING AND IMPLEMENTING WIRELESS COMMUNICATIONS SYSTEMS

CROSS REFERENCE TO RELATED APPLICATIONS

This application is a continuation in part of U.S. patent application Ser. No. 15/604,072, filed May 24, 2017; application Ser. No. 15/604,702 was a continuation of U.S. patent application Ser. No. 14/805,407, filed Jul. 21, 2015, now U.S. Pat. No. 9,668,148, issued May 30, 2017; application Ser. No. 14/805,407 was a continuation in part of U.S. patent application Ser. No. 14/583,911 "OTFS METHODS OF DATA CHANNEL CHARACTERIZATION AND USES THEREOF", filed Jan. 19, 2015, now U.S. Pat. No. 9,444,514 issued Sep. 13, 2016; application Ser. No. 14/583,911 claimed the priority benefit of U.S. provisional application 62/027,231, "METHODS OF OPERATING AND IMPLEMENTING WIRELESS OTFS COMMUNICATIONS SYSTEMS", filed Jul. 21, 2014; application Ser. No. 14/583,911 was also a continuation in part of U.S. patent application Ser. No. 14/341,820," ORTHONORMAL TIME-FREQUENCY SHIFTING AND SPECTRAL SHAPING COMMUNICATIONS METHOD", filed Jul. 27, 2014, now U.S. Pat. No. 9,083,483 issued Jul. 14, 2015; application Ser. No. 14/341,820 in turn was a continuation of U.S. application Ser. No. 13/117,119, "ORTHONORMAL TIME-FREQUENCY SHIFTING AND SPECTRAL SHAPING COMMUNICATIONS METHOD", filed May 26, 2011, now U.S. Pat. No. 8,879,378 issued Nov. 4, 2014; application Ser. No. 13/117,119 claimed the priority benefit of U.S. provisional patent application 61/349,619, "ORTHONORMAL TIME-FREQUENCY SHIFTING AND SPECTRAL SHAPING COMMUNICATIONS METHOD", filed May 28, 2010; application Ser. No. 14/583,911 was also a continuation in part of U.S. patent application Ser. No. 13/430,690, "SIGNAL MODULATION METHOD RESISTANT TO ECHO REFLECTIONS AND FREQUENCY OFFSETS", filed Mar. 27, 2012, now U.S. Pat. No. 9,083,595 issued Jul. 14, 2015; application Ser. No. 13/430,690 in turn claimed the priority benefit of US provisional patent provisional application 61/615,884, "SIGNAL MODULATION METHOD RESISTANT TO ECHO REFLECTIONS AND FREQUENCY OFFSETS", filed Mar. 26, 2012; application Ser. No. 13/430,690 was also a continuation in part of U.S. patent application Ser. No. 13/117,119, "ORTHONORMAL TIME-FREQUENCY SHIFTING AND SPECTRAL SHAPING COMMUNICATIONS METHOD", filed May 26, 2011, now U.S. Pat. No. 8,879,378 issued Nov. 4, 2014; application Ser. No. 14/583,911 was also a continuation in part of U.S. patent application Ser. No. 13/927,091, filed Jun. 25, 2013, "Modulation and equalization in an orthonormal time-frequency shifting communications system", now U.S. Pat. No. 9,130,638 issued Sep. 8, 2015; application Ser. No. 13/927,091 claimed the priority benefit of U.S. provisional patent application 61/664,020 filed Jun. 25, 2012; This application is also a continuation in part of U.S. patent application Ser. No. 15/485,101, filed Apr. 11, 2017; application Ser. No. 15/485,101 was a continuation of application Ser. No. 14/805,400, "METHODS OF OPERATING AND IMPLEMENTING WIRELESS OTFS COMMUNICATIONS SYSTEMS", filed Jul. 21, 2015, now U.S. Pat. No. 9,634,719, issued Apr. 25, 2017; application Ser. No. 14/805,400 claimed the priority benefit of U.S. provisional application 62/027,213 "METHODS OF OPERATING AND IMPLEMENTING WIRELESS OTFS COMMUNICATIONS SYSTEMS", filed Jul. 21, 2014; the entire contents of all of these applications are incorporated herein by reference.

BACKGROUND OF THE INVENTION

Field of the Invention

This invention is in the field of telecommunications, in particular wireless telecommunications utilizing novel modulation techniques.

Description of the Related Art

Modern electronics communications, such as optical fiber communications, electronic wire or cable based communications, and wireless communications all operate by modulating signals and sending these signals over their respective optical fiber, wire/cable, or wireless mediums or communications channels. In the case of optical fiber and wire/cable, often these data communications channels consist of one (or between one and two) dimensions of space and one dimension of time. In the case of wireless communications, often these communications channels will consist of three dimensions of space and one dimension of time. However, for many ground-based wireless applications, often the third spatial dimension of height or altitude is less important than the other two spatial dimensions.

As they travel through the communications channel, the various signals, which generally travel at or near the speed of light, are generally subject to various types of degradation or channel impairments. For example, echo signals can potentially be generated by optical fiber or wire/cable medium whenever a signal encounters junctions in the optical fiber or wire/cable. Echo signals can also potentially be generated when wireless signals bounce off of wireless reflecting surfaces, such as the sides of buildings, and other structures. Similarly frequency shifts can occur when the optical fiber or wire/cable pass through different regions of fiber or cable with somewhat different signal propagating properties or different ambient temperatures. For wireless signals, signals transmitted to or from a moving reflector, or to or from a moving vehicle are subject to Doppler shifts that also result in frequency shifts. Additionally, the underlying equipment (i.e. transmitters and receivers) themselves do not always operate perfectly, and can produce frequency shifts as well.

These echo effects and frequency shifts are unwanted, and if such shifts become too large, can result in lower rates of signal transmission, as well as higher error rates. Thus methods to reduce such echo effects and frequency shifts are of high utility in the communications field.

In previous work, exemplified by applicant's U.S. patent application Ser. Nos. 61/349,619, 13/177,119, 13/430,690 and as well as U.S. Pat. No. 8,547,988, applicant taught a novel method of wireless signal modulation that operated by spreading data symbols over a larger range of times, frequencies, and spectral shapes (waveforms) than was previously employed by prior art methods (e.g. greater than such methods as Time Division Multiple Access (TDMA), Global System for Mobile Communications (GSM), Code Division Multiple Access (CDMA), Frequency Division Multiple Access (FDMA), Orthogonal Frequency-Division Multiplexing (OFDM), or other methods).

Applicant's methods, previously termed "Orthonormal Time Frequency Shifting and Spectral Shaping (OTFSSS)" in U.S. Ser. No. 13/117,119 (and subsequently referred to by the simpler "OTFS" abbreviation in later patent applications such as U.S. Ser. No. 13/430,690) operated by sending data in larger "chunks" or frames than previous methods. That is, while a prior art CDMA or OFDM method might encode and send units or frames of "N" symbols over a communications link over a set interval of time, applicant's OTFS methods would typically be based on a minimum unit or frame of $N^2$ symbols, or N×M symbols, and often transmit these $N^2$ symbols or N×M symbols over longer periods of time. In some embodiments, these data symbols may be complex numbers.

According to this type of scheme, each data symbol from the $N^2$ symbol or N×M symbols would typically be distributed, in a lossless and invertible (e.g. reversible) manner, across a plurality of distinguishable (e.g. usually mutually orthogonal) waveforms over a plurality of different times and plurality of different frequencies. These different times and frequencies were generally chosen according to the time delay and Doppler-shift channel response parameters of the wireless channel. Due to this lossless spreading, and selection of different times and frequencies, the information from each data symbol was spread throughout the plurality of different times and different frequencies, so that all data symbols in the frame were equally impacted by the time delay and Doppler frequency shift characteristics of the channel. These methods helped made the communications channel more "stationary" (e.g. deterministic and non-fading) as a result. That is, within a given frame, there were no data symbols subject to greater distortion or fading, relative to other data symbols.

In some OTFS modulation embodiments, each data symbol or element that is transmitted was also spread out to a much greater extent in time, frequency, and spectral shape space than was the case for prior art methods. As a result, at the receiver end, it often took longer to start to resolve the value of any given data symbol because this symbol had to be gradually built-up or accumulated as the full frame of $N^2$ symbols is received.

Thus some embodiments of applicant's prior work taught a wireless communication method that used a combination of time, frequency and spectral shaping to transmit data in convolution unit matrices (data frames) of N·N ($N^2$) (e.g. N×N, N times N) symbols. In some embodiments, either all $N^2$ data symbols are received over N spreading time intervals (each composed of N time slices), or none are. In other embodiments this requirement was relaxed.

To determine the times, waveforms, and data symbol distribution for the transmission process, the $N^2$ sized data frame matrix could, for example, be multiplied by a first N·N time-frequency shifting matrix, permuted, and then multiplied by a second N·N spectral shaping matrix, thereby mixing each data symbol across the entire resulting N·N matrix. This resulting data matrix was then selected, modulated, and transmitted, on a one element per time slice basis. At the receiver, the replica matrix was reconstructed and deconvoluted, revealing a copy of the originally transmitted data.

For example, in some embodiments taught by U.S. patent application Ser. No. 13/117,119, the OTFS waveforms could be transmitted and received on one frame of data ([D]) at a time basis over a communications link, typically processor and software driven wireless transmitter and receiver. All of the following steps were usually done automatically using at least one processor.

This first approach used frames of data that would typically comprise a matrix of up to $N^2$ data elements, N being greater than 1. This method was based on creating an orthonormal matrix set comprising a first N×N matrix ($[U_1]$) and a second N×N matrix ($[U_2]$). The communications link and orthonormal matrix set were typically chosen to be capable of transmitting at least N elements from a matrix product of the first N×N matrix ($[U_1]$), a frame of data ([D]), and the second N×N matrix ($[U_2]$) over one time spreading interval (e.g. one burst). Here each time spreading interval could consist of at least N time slices. The method typically operated by forming a first matrix product of the first N×N matrix ($[U_1]$), and the frame of data ([D]), and then permuting the first matrix product by an invertible permutation operation P, resulting in a permuted first matrix product $P([U_1][D])$. The method then formed a second matrix product of this permuted first matrix product $P([U_1][D])$ and the second N×N_matrix ($[U_2]$) forming a convoluted data matrix, according to the method, this convoluted data matrix could be transmitted and received over the wireless communications link by:

On the transmitter side, for each single time-spreading interval (e.g. burst time), the method operated by selecting N different elements of the convoluted data matrix, and over different said time slices in this time spreading interval, using a processor to select one element from the N different elements of the convoluted data matrix, modulating this element, and wirelessly transmitting this element so that each element occupies its own time slice.

On the receiver side, the receiver would receive these N different elements of the convoluted data matrix over different time slices in the various time spreading intervals (burst times), and demodulate the N different elements of this convoluted data matrix. These steps would be repeated up to a total of N times, thereby reassembling a replica of the convoluted data matrix to the receiver.

The receiver would then use the first N×N matrix ($[U_1]$) and the second N×N matrix ($[U_2]$) to reconstruct the original frame of data ([D]) from the convoluted data matrix. In some embodiments of this method, an arbitrary data element of an arbitrary frame of data ([D]) could not be guaranteed to be reconstructed with full accuracy until the convoluted data matrix had been completely recovered.

U.S. patent application Ser. No. 13/117,119 and its provisional application 61/359,619 also taught an alternative approach of transmitting and receiving at least one frame of data ([D]) over a wireless communications link, where again this frame of data generally comprised a matrix of up to $N^2$ data elements (N being greater than 1). This alternative method worked by convoluting the data elements of the frame of data ([D]) so that the value of each data element, when transmitted, would be spread over a plurality of wireless waveforms, where each individual waveform in this plurality of wireless waveforms would have a characteristic frequency, and each individual waveform in this plurality of wireless waveforms would carry the convoluted results from a plurality of these data elements from the data frame. According to the method, the transmitter automatically transmitted the convoluted results by shifting the frequency of this plurality of wireless waveforms over a plurality of time intervals so that the value of each data element would be transmitted as a plurality of frequency shifted wireless waveforms sent over a plurality of time intervals. At the receiver side, a receiver would receive and use a processor to deconvolute this plurality of frequency shifted wireless waveforms sent over a plurality of times, and thus reconstruct a replica of at least one originally transmitted frame of data ([D]). Here again, in some embodiments, the convolution and deconvolution schemes could be selected so such that an arbitrary data element of an arbitrary frame of data ([D]) could not be guaranteed to be reconstructed with full accuracy until substantially all of the plurality of frequency shifted wireless waveforms had been transmitted and received. Between frames, the same patterns of time shifts and frequency shifts may repeat, so between frames, these time shifts and frequency shifts can be viewed as being cyclic time sifts and cyclic frequency shifts.

Within a given frame, however, although the time shifts and frequency shifts may in some embodiments also be cyclic time shifts and cyclic frequency shifts, this need not always be the case. For example, consider the case where the system is transmitting an M×N frame of data using M frequencies, over N time periods. Here for each time period, the system may simultaneously transmit M OTFS symbols using M mutually orthogonal carrier frequencies (e.g. tones, subcarriers, narrow band subcarriers, OFDM subcarriers, and the like). The OFTS carrier frequencies (tones, subcarriers) are all mutually orthogonal, and considering the N time periods, are also reused each time period, but need not be cyclic.

In other embodiments, the methods previously disclosed in U.S. patent application Ser. No. 13/927,091; 13/927,086; 13/927,095; 13/927,089; 13/927,092; 13/927,087; 13/927,088; 13/927,091; and/or provisional application 61/664,020 may be used for some of the OTFS modulation methods disclosed herein. The entire contents of U.S. patent application Ser. No. 13/927,091; 13/927,086; 13/927,095; 13/927,089; 13/927,092; 13/927,087; 13/927,088; 13/927,091; 14/583,911; 62/027,213 and 61/664,020 are incorporated herein by reference in their entirety.

BRIEF SUMMARY OF THE INVENTION

In some embodiments, the present disclosure discusses various communication technology products, processes and systems that are particularly useful for multiuser, point-to-point, point-to-multipoint, meshed, cellular fixed and/or mobile communications. To do this, the invention often makes use of the simultaneous modulation of discrete information symbols across multiple modulation dimensions (e.g. two or more modulation dimensions such as time-shift dimensions, frequency-shift dimensions, space-shift dimensions, polarization-rotation dimensions, scale dimensions, and the like). In other embodiments, the invention may make use of novel modulation techniques derived from representation theory, at times assisted by various combinations with MIMO (e.g. multiple-input and multiple output antennas) or other wireless beam forming technology. Although in this specification, wireless media are most frequently used as specific examples, in alternative embodiments, the concepts discussed herein may also be applied to other types of media, including various types of non-wireless media.

The invention is based, in part, on the observations and insight that present day communications systems, such as wireless systems, are too often plagued by apparently unpredictable (e.g. apparently non-deterministic) signal fading and interference. Consider wireless cell phone communications. These operate by transmitting wireless signals (e.g. radio signals) through a "communications channel" consisting of three dimensional space and time (here we will at present neglect the effects of air, clouds, rain, and the like. Also note that the height dimension is often minimal relative to the other dimensions, and thus often a two dimensional space and time model of the communications channel is adequate). Envision this taking place in an urban environment. As a cell phone changes position, the signals to and from the cell phone and a cell phone base station can be subject to apparently unpredictable amounts of distortion and interference as the wireless signals are reflected off of various objects (e.g. buildings, bridges, moving vehicles) and the like. We can view the sum total of these various objects as imposing a "structure" on the communications channel.

Each reflection produces various time-delayed "echo" wireless signals. Depending on the relative movement of the cell phone, the base station, and various intermediate reflectors (e.g. moving vehicles), these various echo reflections can also be frequency shifted as well (e.g. Doppler shifted). By the time that all these various time-delayed and frequency shifted signals arrive at a particular receiving antenna (be it a cell phone antenna or base station antenna), the various signals will be distorted and will often be subject to an apparently unpredictable (e.g. apparently non-deterministic) changes in signal intensity, resulting in fading and other communications impairments.

These effects are often called the "channel response" of a communications channel. Prior art in the field tended to treat these types of signal fading and other distortion as being inherently non-deterministic and essentially impossible to solve for. Prior art instead tended to teach statistical approaches to merely describe the chances of such fading and other problems occurring. Thus prior art methods tended use statistical parameters (e.g. typical fading duration times, typical length of time that a signal would remain coherent, typical frequency bandwidth that a wireless signal would remain coherent, and the like) to try to cope with these issues.

By contrast, the present invention is based, in part, on the insight that modern electronics (e.g. processing capability and speed) now make alternative approaches possible. In particular, the invention is based on the concept of transmitting data, often in the form of short time duration bursts, that are modulated in a novel manner that is intended to both expose the underlying structure (e.g. distribution of reflectors, relative velocity of transmitters, receivers, reflectors, and the like) of the communications channel, as well as to make it more feasible to (in effect) solve for the distorting effects of these objects as wireless signals propagate through the communications channel. In essence, this "solving" allows the system to sort out many of the reflections and other signal shifts, and to intelligently correct (e.g. deconvolute) the various distortions (convolutions) imposed on the signal by the data channel structure.

According to the invention, wireless signals are often modulated according to a series of short bursts and various time shifts intended to help expose relative distances at which signal reflectors may be disposed in the communications channel. At the same time, the invention will often also modulate the wireless signals according to a series of frequency shifts intended to also help expose the relative velocities of the receiver(s), transmitter(s) and reflectors operating in the communications channel. Other types of simultaneous signal modulation, such as according to space (e.g. use of multiple antennas) or other signal parameters (e.g. polarization) may also be used as well.

The invention is also based, in part, on the insight that the better the underlying structure of a communications channel can be characterized, the better the overall performance. Thus use of multiple antennas can help characterize the underlying structure of a communications channel (e.g. using parallax effects to better locate reflectors), as well as aiding in beam formation to direct wireless energy transmitters or receivers in more advantageous patterns. Because not all reflectors reflect radio waves in the same way (some reflectors impart polarization changes), use of polarized wireless signals can also help better characterize the underlying structure of a communications channel, as well as to help select specific wireless signal polarization modes that may be more useful given the particular structure of the communications channel at hand.

Other methods may also be used to improve the performance of the system still further. Some of these other methods can include methods of sending and receiving data by also packaging data symbols into matrix-like data frames. These matrix like data frames can often be configured with pilot signals to help the system better characterize the structure of the data channel, as well as often configured with various error codes that can help the system detect problems and take corrective action. In addition to standard error correcting purposes, such error codes can also be helpful in informing the system when its underlying understanding of the structure of the data channel may be suboptimum, and when further optimization (e.g. sending more pilot symbols, configuring various time-frequency-polarization, multiple antenna configurations, and the like) would be useful. Various methods of interleaving data frames, adjusting burst type, to optimize other system characteristics such as latency (e.g. time delay needed to transmit a given set of data) will also be discussed.

BRIEF DESCRIPTION OF THE DRAWINGS

FIG. 4 also shows how use of OTFS pilot symbol waveform bursts can help the system determine the channel response parameters of the system, and hence help direct the MIMO OTFS transmitter beam towards the OTFS receiver.

DETAILED DESCRIPTION OF THE INVENTION

Figure 1:
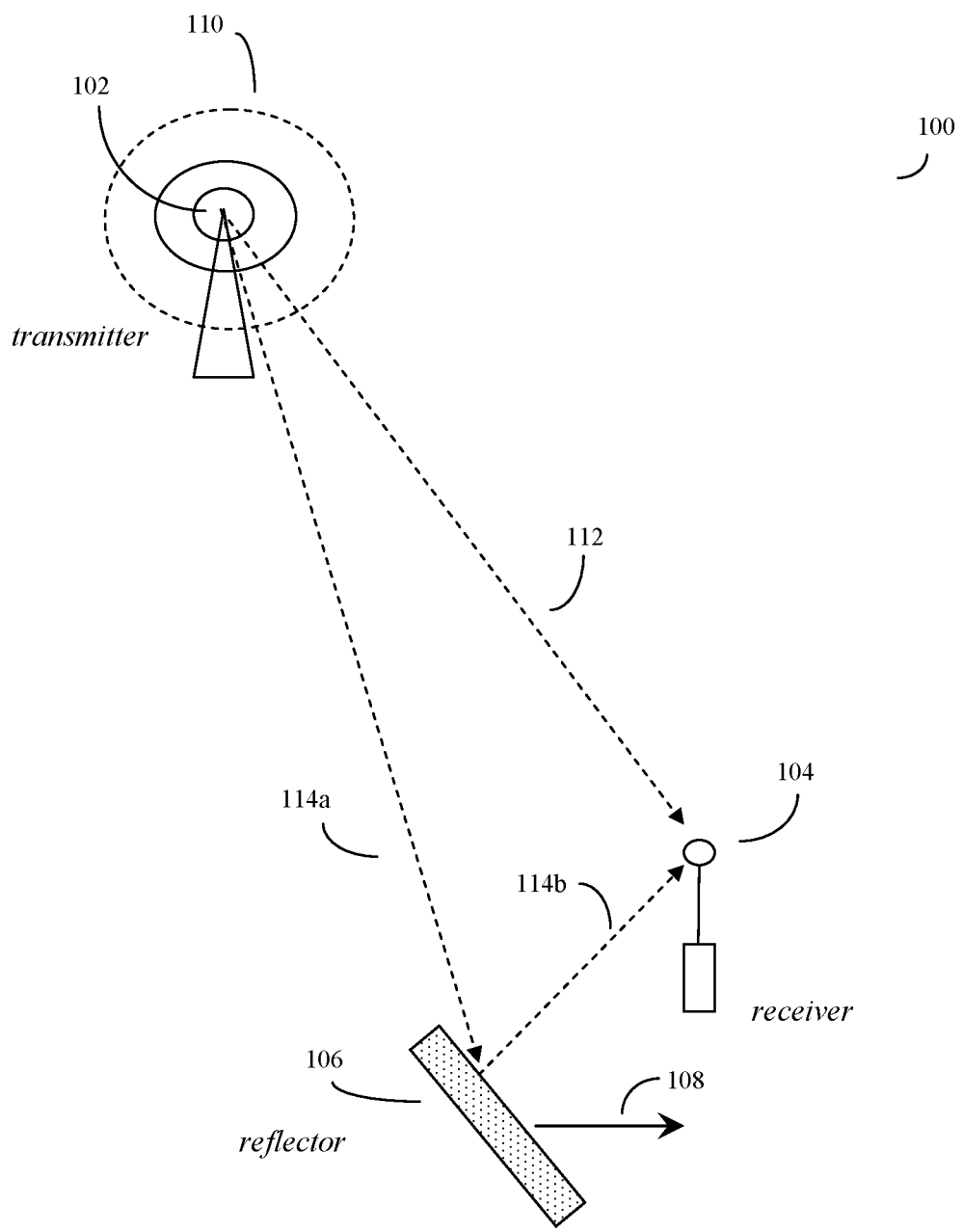
FIG. 1 shows an abstracted model of at least one wireless transmitter, receiver (each of which may have their own velocities and locations), operating relative to at least one wireless reflector (which may have its own location, various coefficients of reflection and velocities) in a data channel (here only two dimensions of space are shown, and the time dimension is shown by the velocity arrow of the reflector).

As previously discussed, the invention is based in part on the insight that in contrast to prior art methods that tended to view variations in signal strength (e.g. occasional signal fading, how long a signal remains coherent, how large a range of signal frequency ranges can be expected to be coherent) as something that can only be handled by statistical methods, superior results can be obtained if the underlying structure of a communications channel is exposed, and the various causes of signal distortion (e.g. various reflections, frequency shifts, other shifts and the like) are instead sorted out or "solved for".

Since communication channels are used to transmit data, throughout this disclosure, generally communication channels will referred to as "data channels". The main focus of this disclosure will be on wireless data channels that transmit data (often using radio signals of various frequencies up into the microwave frequencies and beyond) though three dimensions of space (often on earth, where the "space" may be filled with air and even other natural airborne objects such as clouds, raindrops, hail and the like) and one dimension of time. However at least a number of the concepts disclosed herein can also be used for other data channels operating in other media (e.g. water, conductive metals, transparent solids, and the like). In some embodiments, some spatial dimensions, such as height, may be less important. Thus for generality, the invention will often be referred to as operating using a multi-dimensional data channel comprising at least two dimensions of space and one dimension of time. It should be understood, however that although often the invention will operate in three dimensions of space and one dimension of time; embodiments that only operate in one effective dimension of space and one dimension of time are also contemplated.

The invention makes use of modern electronic components, such as processors (e.g. microprocessors, which can even be commonly used processors such as the popular Intel x86 series of processors), and digital signal processors; and often will employ modern software configured wireless transmitters and receivers which can, for example, be implemented by various field programmable gate arrays (FPGA). Here the methods of Harris, "*Digital Receivers and Transmitters Using Polyphase Filter Banks for Wireless Communications*", IEEE transactions volume 51 (4), April 2003, pages 1395-1412. Application specific integrated circuits (ASICs) and other types of devices and methods may also be used.

Although the invention has many embodiments, some of which will be discussed at length herein, at the core, many of these embodiments can be considered to be based on an automated method of transmitting (usually wirelessly transmitting) a plurality of symbols (often OTFS symbols, often carrying data) through a multi-dimensional data channel (often these multiple dimensions will be at least one or two, and often three dimensions of space and one dimension of time) between at least one wireless transmitter and at least one wireless receiver.

One unique aspect of the invention is that it often wirelessly transmits data symbols in the form of orthogonal time shifted and frequency shifted wireless waveforms, often referred to in this specification as OTFS symbols and OTFS waveforms. OTFS symbols and OTFS waveforms can be implemented by various methods, some of which were previously disclosed in parent applications U.S. Ser. Nos. 61/349,619, 13/177,119, 13/430,690 and as well as U.S. Pat. No. 8,547,988; all of which are incorporated herein by reference in their entirety. Please refer to these earlier disclosures for a more detailed discussion of various aspects of OTFS waveform technology, as well as a more detailed discussion as to various methods to implement OTFS symbols and data frames.

To briefly summarize some aspects of these earlier disclosures, in some embodiments, data symbols intended for transmission as OTFS symbols may, on the transmitter side, be distributed, usually automatically using at least one processor and appropriate software, over various symbol matrices or "data frames". These may be N·N matrices, or even N·M matrices (where M is different from N). These symbol matrices or data frames are then used as input to control the modulation of the system's wireless transmitter(s). Specifically the data symbols intended for transmission may be used to weigh or modulate a family of time shifted and frequency shifted waveforms.

This can be done by, for example, at the transmitter using the data symbols to control the operation of a bank of wireless signal modulators (e.g. QAM modulators, which may be implemented using the previously discussed methods of Harris or other methods). The resulting output can, for example, result in a plurality of bursts of QAM modulated waveforms, over a plurality of frequencies and time shifts, which can later be used by the receiver to help identify the structure of the data channel (e.g. positions and velocities of various reflectors).

Although these waveforms may then be distorted during transmission, their basic time and frequency repeating structure can be used by the system's receivers, along with appropriate receiver based deconvolution methods, to correct for these distortions by utilizing the repeating patterns to determine the type of deconvolution needed.

To generalize, in the methods described herein, symbols, which can comprise any of pilot symbol, null symbols, and usually data symbols are arranged into at least one, and often a plurality of symbol frames, sometimes also called planes. The symbols may be a variety of different types of symbols, but often may be represented as complex numbers, often complex integers (e.g. Gaussian integers) and/or QAM symbols. These symbol frames are thus typically two dimensional arrays such as N×N or N×M frames of these symbols, where both N and M are integers greater than 1. The system will typically operate on a per symbol frame basis.

Typically, on a per symbol frame basis, at least one processor (usually a transmitter processor) will spread the information in at least each data symbol (in a given symbol frame) across at least all data symbols in that symbol's frame using a lossless and invertible transformation. Various specific types of lossless and invertible transformations are described herein, but these specific examples are not intended to be limiting. The net result of this transformation process is that at least for each set of data symbols in a given data symbol frame or data symbol portion of a frame, a corresponding two dimensional OTFS frame (data plane) comprising a plurality of OTFS symbols will be generated. Although often, if a given symbol frame has N×M symbols, a corresponding OTFS frame comprising N times M symbols will be generated, this example is also not intended to be limiting. These OTFS symbols will then be transmitted in a manner in which (again on a per OTFS frame basis), each OTFS symbol derived from data symbols in that OTFS frame will be spread throughout a plurality of mutually distinguishable (usually because they are mutually orthogonal) time shifted and frequency shifted wireless OTFS waveform bursts. These OTFS waveform bursts then traverse the data channel as discussed elsewhere in this disclosure.

Again to generalize, the wireless receiver(s) will typically then receive the now channel convoluted OTFS waveform bursts on a per OTFS frame basis, and after deconvolution, derive at least an approximation of the originally transmitted OTFS waveform bursts, thereby creating an approximation or replica of the originally transmitted OTFS frame (replica OTFS frame). The receiver can then use at least one processor (typically a receiver processor) and an inverse of the transformation to extract replica symbols from this approximation of the originally transmitted OTFS frame (replica OTFS frame).

As a consequence of this method (e.g. due to the lossless and invertible spreading), or as a further constraint on this method, typically at least for data symbols, an arbitrary (data) symbol cannot be guaranteed to be extracted (i.e. transmitted and received) with full accuracy unless substantially all of the OTFS symbols from that symbol's particular frame of OTFS symbols have been transmitted and received. Here "substantially all" will be somewhat dependent on the specifics of the situation (frame size, use of pilot symbols, error detection/correction symbols, and the like), but often will require that 80% or more of at least the data symbol derived OTFS symbols be successfully transmitted and received. In some limiting situations, where there is no use of pilot symbols or error detection/correction symbols, and no redundancy in the data symbols, all OTFS symbols in a given OTFS frame will need to be successfully transmitted and received. However such lack of robustness is not desirable, and typically this later situation will be avoided.

FIG. 1 shows an abstracted model of the structure of the data channel (100), in which at least one wireless transmitter (102), receiver (104) (both the transmitter and the receiver have their own respective velocities and locations), operating relative to at least one wireless reflector (106). Each wireless reflector (106) will typically have its own location, various coefficients of wireless reflection and velocities (108). These transmitters, receivers, and reflector(s) operate in a data channel that, in the example of wireless communications, can be two or three dimensions of space (here we are neglecting atmospheric issues) and a dimension of time. The time dimension is exemplified by the velocity arrow (108) indicating that in this example the reflector (106) is moving. To keep the diagram simple, the transmitter and the receiver are shown as stationary, although in fact they each may have their own velocities as well.

In a more basic aspect of the invention, the invention may thus be a method of using at least one transmitter (102) and at least one transmitter based processor to wirelessly transmit a plurality of symbols as a plurality of OTFS symbols (110). As previously discussed, each OTFS symbol in these plurality of OTFS symbols are generally spread throughout a plurality of mutually orthogonal time convoluted (or shifted) and frequency convoluted (or shifted) wireless OTFS waveform bursts, which here will be designated as "originally transmitted wireless OTFS waveform bursts". The word "burst" is intended to designate that the modulated waveforms will have limited time duration, typically a small fraction of a second. These small time duration bursts are can be understood as having a secondary function that is a somewhat like the small bursts or chirps used in echo location and radar; the bursts help the receiver better distinguish the relative locations of various reflectors, and generally assist in later signal deconvolution at the receiver end.

As these wireless OTFS waveform bursts travel (propagate) through the multi-dimensional data channel (100) (e.g. space between the transmitter (102) and receiver (104) also including any reflectors (106), the originally transmitted wireless OTFS waveform bursts (110) generally travel over at least one path. This at least one path will generally comprise either a direct path (112) and/or one or more reflected paths (114a, 114b).

Thus direct path (112) will generally be created by originally transmitted wireless OTFS waveform bursts (110) traveling in a generally straight line (112) from the at least one wireless transmitter (102) to the at least one wireless receiver (104). These will be termed "direct wireless OTFS waveform bursts".

Similarly reflected paths (114a, 114b) will generally be created when the originally transmitted OTFS waveform bursts (114a) reflect (114b) off of at least one wireless reflector (106) (which may be moving at a given velocity (108)) before reaching the wireless receiver(s) (104). These reflected waveforms (114b) will, in this example be both time delayed and Doppler frequency shifted relative to the direct wireless OTFS waveform bursts (112). Thus these time delayed and Doppler frequency shifted waveforms will be termed "time delayed and Doppler frequency shifted reflected wireless OTFS waveform bursts" (114b) when they are received at the wireless receiver (104). Note also that due to the relative locations and velocities of the transmitter (102) and receiver (104), even the direct waveforms (112) may be time delayed and frequency shifted as well, but for now this effect is ignored in the present discussion because what mainly matters is that at the receiver, the direct (112) and indirect (114b) waveforms meet. Because they have different time delays and frequency shifts, they will then engage in constructive and destructive interference with each other, and this is the major problem at hand. Of course more generally, direct path time delays and frequency shifts must also be taken into account.

Returning to the present example, at the wireless receiver(s) (104), the resulting combination of essentially any direct wireless OTFS waveform bursts (112) and any reflected wireless OTFS waveform bursts (114b) will produce patterns of constructive and destructive interference (which can result in channel fading, among other problems). This combination will be termed "channel convoluted OTFS waveform bursts".

Such patterns of constructive and destructive interference can produce problems and fading regardless of the modulation scheme of the wireless waveforms being transmitted. Prior art merely attempted (using various statistical methods) to determine the likelihood of such problems to then configure system settings so that wireless systems could continue to communicate, but at a lesser degree of functionality. By contrast the present art teaches an alternative approach.

The prior art, for example, would teach the that since the reflected energy from reflected signal (114b) is often lower than the direct signal (112), then one (suboptimal) solution would be to reduce the sensitivity of the receiver (104) and continue to receive direct signal (112) at a lower level of efficiency.

Alternatively, as is often done for some OFDM systems, echo effects can be mitigated by splitting the information over a large number of narrow-band OFDM subcarriers, each carried by mutually orthogonal tones, but transmitting information on each subcarrier at a relatively slow rate. But this doesn't really "solve the problem", just mitigates it, because each OFDM subcarrier is still affected by reflected signals, and thus must still operate at a slower than optimum rate. Some OFDM systems also try to avoid the echo effect problem by use of cyclic prefix type waveforms, which slows down the data carrying rate of each OFDM subcarrier still further.

By contrast, the presently disclosed art teaches something more akin to continuing to operate, at an almost normal level of functionality, despite such patterns of constructive and destructive interference. This is done by, for example, sending waveforms capable of letting the receiver (104) analyze the existence and properties of intermediate reflector (106). This in turn lets the receiver adapt its operation to also make use of wireless energy from reflected signal (114b). In essence, the invention's methods can instruct the receiver not to diminish its sensitivity, but rather to expect some reflected signals (114b) to be similar to the direct signals (112), but offset by a certain time delay and frequency.

Thus rather than diminish the sensitivity of receiver (104), the invention instead directs the receiver to process the received signal to supplement the direct signal (112) with appropriately adjusted time and frequency shifted signal (114b). This allows the system to operate at nearly full efficiency, and in a deterministic manner that is effectively non-fading because the signal from the transmitter (102) is almost never lost, just transformed into a different form (e.g. more into waveforms (114b) depending on the location and velocity of the reflector(s) (106).

Thus according to many embodiments of the methods disclosed herein, receiver(s) (104) will receive these channel convoluted OTFS waveform bursts (e.g. any combination of 112 and 114b), and will usually use it's at least one receiver based processor to deconvolute these channel convoluted OTFS waveform bursts. That is, the receiver will correct for the distortions caused by, for example, the constructive interference of signals (112) and (114b) by analyzing these signals and applying at least the appropriate time delays and frequency corrections in order to allow signals (112) and (114b) to be correctly analyzed by receiver. The OTFS receiver (104) understands that (112) and (114b) are merely different forms of the same signal. The receiver thus properly receives these symbols in a deterministic and generally fade resistant manner even as the position and or velocity of reflectors such as (106) change.

In some embodiments, this deconvolution process can be done by using at least one processor (often a receiver based processor) to characterize the structure of the channel (100). Here, for example, this at least one processor can be used to automatically determine channel response parameters of this multi-dimensional data channel (100) between the wireless transmitter(s) (102) and the wireless receiver(s) (104).

Here of course, as previously described, the "channel response parameters" of the multi-dimensional data channel (100) are created by at least the relative positions, relative speeds, and properties of the wireless transmitter(s) (102), wireless receivers (104), and the various wireless reflector(s) (106), or by other non-reflecting signal attenuator objects (not shown). Essentially, the channel response parameters allow the receiver (104), for example, to understand that x % of the signal received at the receiver (104) is signal (114*b*) that has been frequency shifted by factor "y" and time shifted by factor "z" due to the velocity (108) and location of reflector (106); and to further know (in this example) that the remainder of the signal received by receiver (104) is direct signal (112) that either is not time shifted or frequency shifted, or else is at least time shifted and frequency shifted to a different extent. This allows the receiver to in essence generate a deconvolution model to "solve" for what the original signal (110) really was.

Putting this in alternative language, the wireless receiver(s) (104) will determine the channel response parameters (often by methods to be described shortly) and use these channel response parameters (and often at least one receiver based processor) to deconvolute the received channel convoluted OTFS waveform bursts (combination of 112 and 114*b*), and thereby derive at least an approximation of the originally transmitted OTFS waveform bursts (110).

Often after this deconvolution process is done, the receiver can also use at least one processor to then mathematically extract (e.g. solve for, determine) the plurality of OTFS symbols from the receiver based approximation of the originally transmitted OTFS waveform bursts (110). For these purposes, often the matrix math based methods of application Ser. Nos. 61/349,619, 13/177,119, 13/430,690 and as well as U.S. Pat. No. 8,547,988; all of which are incorporated herein by reference in their entirety can be used. Other methods, including analog methods, numeric approximation methods, and the like, may be also be used for these purposes. Once the various OTFS symbols have been determined at the receiver, by whatever method, the system will have then transmitted at least some of the original OTFS symbols between the wireless transmitter(s) (102) to the wireless receiver(s) (104).

In addition to the matrix math methods discussed above, alternative variations on these methods may also be practiced. In some embodiments, the previously expressed (e.g. application Ser. Nos. 61/349,619, 13/177,119, 13/430,690 and as well as U.S. Pat. No. 8,547,988) preference for transmitting OTFS data symbols in the form of OTFS data frames or data planes composed of N×N data symbol matrices, and subsequently at the receiver retrieving the transmitted data symbols by inverting the transmitted N×N matrices, can be relaxed and/or supplemented by alternative methods.

Alternative OTFS Data Frame Methods

In an alternative process, the methods described above may be implemented by transmitting a plurality of OTFS symbols by spreading each OTFS symbol through a series of N time convoluted (or shifted), and M frequency convoluted (or shifted) mutually orthogonal waveform bursts. In this embodiment, again both N and M will each be integers greater than 1, and N does not have to equal M. This alternative method thus packages the OTFS symbols in the form of one or more (often a plurality of) OTFS data planes (here planes and frames will often be used interchangeably), each comprising an N·M matrix of mutually orthogonal time convoluted (or shifted) and frequency convoluted (or shifted) waveform bursts. This process is thus capable of transmitting up to n·m different OTFS symbols per OTFS data plane. Here the main constraint is that at least in the absence of noise or other form of data corruption, each OTFS data plane must in principle be capable of being analyzed (e.g. solved) by at least one processor (usually a receiver processor). The results of this analysis process should be that each OFTS symbol in the plurality of up to N·M different OTFS symbols in any given OTFS data plane can be reconstructed (e.g. determined).

This alternative N·M rectangular matrix formulation of OTFS data planes thus differs from the earlier N·N (or N×N) OTFS data planes in that if, for example, M>N, then there will be extra OTFS symbols that may transmitted using either a greater extent of time shifting or a greater extent of frequency shifting than would be the case in an N·N data matrix. These extra OTFS symbols can be used to transmit more useful data (e.g. transmit a greater data payload), or alternatively may be used to for other purposes. Some of these other purposes include helping the system achieve better time synchronization, better error correction. This approach can also be useful in situations where the problem of time delays on the channel are greater than the problem of Doppler frequency shifts, or the problem of Doppler frequency shifts are greater than the problem of time delays, and more resolution is desired in one dimension (e.g. time delay or frequency shift) than the other dimension (e.g. time delay or frequency shift). As will be discussed below, in some embodiments, the extra rows or columns or both may also be used to transmit pilot signals to help determine channel response parameters/deconvolution parameters.

There are otherwise a number of different ways to reconstruct or determine each OTFS symbol. As previously discussed, in addition to the matrix math methods previously discussed in application Ser. Nos. 61/349,619, 13/177,119, 13/430,690 and as well as U.S. Pat. No. 8,547,988, other methods, including numeric approximation methods, and even analog computational methods, may be allowed, although generally digital operations that can be performed using a processor or digital signal processor are preferred.

Acquiring or Initially Characterizing the Data Channel Response Parameters

As previously discussed, the system operates using OTFS waveforms that are designed to help elucidate the underlying structure of the data channel (100), and that are transmitted in short bursts (110). The OTFS receiver (104) is generally designed to listen to these various short bursts of OTFS waveforms (110), and in effect make use of the fact that there are repeating echo patterns (e.g. echo 114*b*) and repeating time delay patterns (e.g. caused by the difference in signal travel time between direct path (112 and indirect path 114*a*+114*b*) and repeating frequency shifts (e.g. caused by reflector velocity 108, as well as possible differences in velocity between transmitter (102), receiver (104) and reflector (106) in the OTFS waveforms to make inferences about the structure of the data channel.

It is not necessary that the receiver make a full determination about all of the positions, speeds, and the coefficients of wireless reflection of each and every reflector that may exist in the data channel, and it may not even be necessary to make a full determination of the exact relative location and speeds of the wireless transmitter and receiver. However to work well, the receiver should at least obtain enough information about at least the major sources of reflection and enough information about the major sources of various time delay and frequency shifts, in order to determine the channel response parameters of the channel. These channel response parameters can be viewed as an operator that distorts the original OTFS signal bursts (110) in a manner that mimics the actual signal distortion as detected by the receiver. In essence, the channel response parameters can be viewed as a mathematical model that replicates, hopefully reasonably closely, what the channel structure did to the original OTFS wireless waveforms as these waveforms traveled along the various channel paths to the receiver.

In the case of FIG. 1, if the receiver and transmitter were both stationary, then the channel response parameters would simply be that x % of the original OTFS waveforms were both delayed by a time factor of [(distance 114a+distance 114b−distance 112)]/c, where c is the speed of light, as well as Doppler frequency shifted according to a factor of the reflector velocity 108. Here x % is in part a function of the coefficient of wireless reflection of reflector 106. Other factors would also include the relative orientation of reflector (106), the distance between the reflector 106 and the transmitter 102, as well as the relative distance between the transmitter 102 and the receiver 104 according to an inverse square law formula.

Note however that as we dial in additional variables such the relative locations and velocities of the receiver and transmitter, and as well as other reflectors with their own coefficients of reflection, velocities, and relative locations, the channel response parameters soon become very complex. However because the OTFS wireless signals are constructed to have repeating patterns of time delays and frequency offsets, the unique ability of the OTFS system is that the OTFS waveforms can be structured to contain enough information to allow the receiver to get a reasonably good estimate of the channel response parameters of at least the major signal distortion factors in real life situations.

Once the channel response parameters have been obtained, the next step, obtaining deconvolution parameters (previously discussed in parent application Ser. No. 13/430,690 and again incorporated herein by reference) can be viewed as essentially determining an inverse operator that in effect deconvolutes or equalizes the distorted (e.g. channel response parameter convoluted) OTFS signals back into at least an approximate version of the original OTFS waveforms. In essence, if the channel response parameters are the evil twin that causes harm to the OTFS waveforms, the deconvolution parameters are the good twin that undoes the harm. Mathematically, the two are like two sides of the same coin—one is the inverse of the other, and knowing one also allows you to deduce the other.

In engineering terms, signal deconvolution is often referred to as "equalization", and the devices (be they hardware or software running on processors) that perform this equalization function are often referred to as equalizers.

Although strictly speaking an optional step, in some embodiments, it can be useful to help determine the channel response parameters of a communications channel by presenting the channel with a brief and commonly known (e.g. known to both the transmitter and receiver) calibration input signal such as a sharp pulse (e.g. a Dirac delta function like pulse δ) or other defined symbols or set of symbols. In this disclosure, such defined calibration symbols and signals will be referred to as "pilot symbols" and "pilot signals".

Pilot Signals to Help Determine Channel Response Parameters/Deconvolution Parameters In some embodiments, the system will use at least one transmitter (usually using at least one transmitter based processor) to transmit (usually using OTFS waveforms) at least one pilot symbol in the form of at least one wireless pilot symbol waveform burst at at-least one defined time and frequency.

Note that according to the invention, there are two general types of pilot symbols that are possible. In one form or embodiment of the invention, the pilot symbols, although transmitted according to the same timing, frequency ranges, and general spectral timing as the OTFS data symbols, will nonetheless not be subject to the general OTFS data symbol requirements that the pilot symbols be smeared or distributed over all transmitted symbols, and over a plurality of time and frequency combinations, at the transmitter. This is the embodiment generally discussed here. These OTFS pilot symbols (or waveforms when transmitted), might, in an alternative nomenclature could be called "OTFS associated pilot symbols".

A second form or embodiment of the invention is also possible, however, in which at least some of the pilot symbols are handled by the system in the same way that the system handles data symbol—where at least some pilot symbols are smeared or distributed, by the transmitter, over a plurality of times and frequencies in the same manner as the OTFS data symbols. Indeed these OTFS pilot symbol might even be smeared or distributed in with the OTFS data symbols. Although this later method is less commonly discussed in this disclosure, this alternative approach has certain utility, and thus also may be used in some embodiments of the invention. In this second embodiment, in alternative nomenclature, the pilot symbols could be called "OTFS encoded pilot symbols", or "OTFS modulated pilot symbols".

Generally, however, most of the discussion herein will focus on "OTFS associated pilot symbols", and unless otherwise specified, the pilot symbols and waveforms discussed herein will generally be OTFS associated pilot symbols.

In this scheme, the direct (e.g. 112) and reflected versions (e.g. 114b) of the at least one wireless pilot symbol waveform burst (e.g. 110) reach the at least one wireless receiver (104) as at least one channel convoluted pilot symbol waveform burst (e.g. mixture of 110 and 114b).

Figure 2:
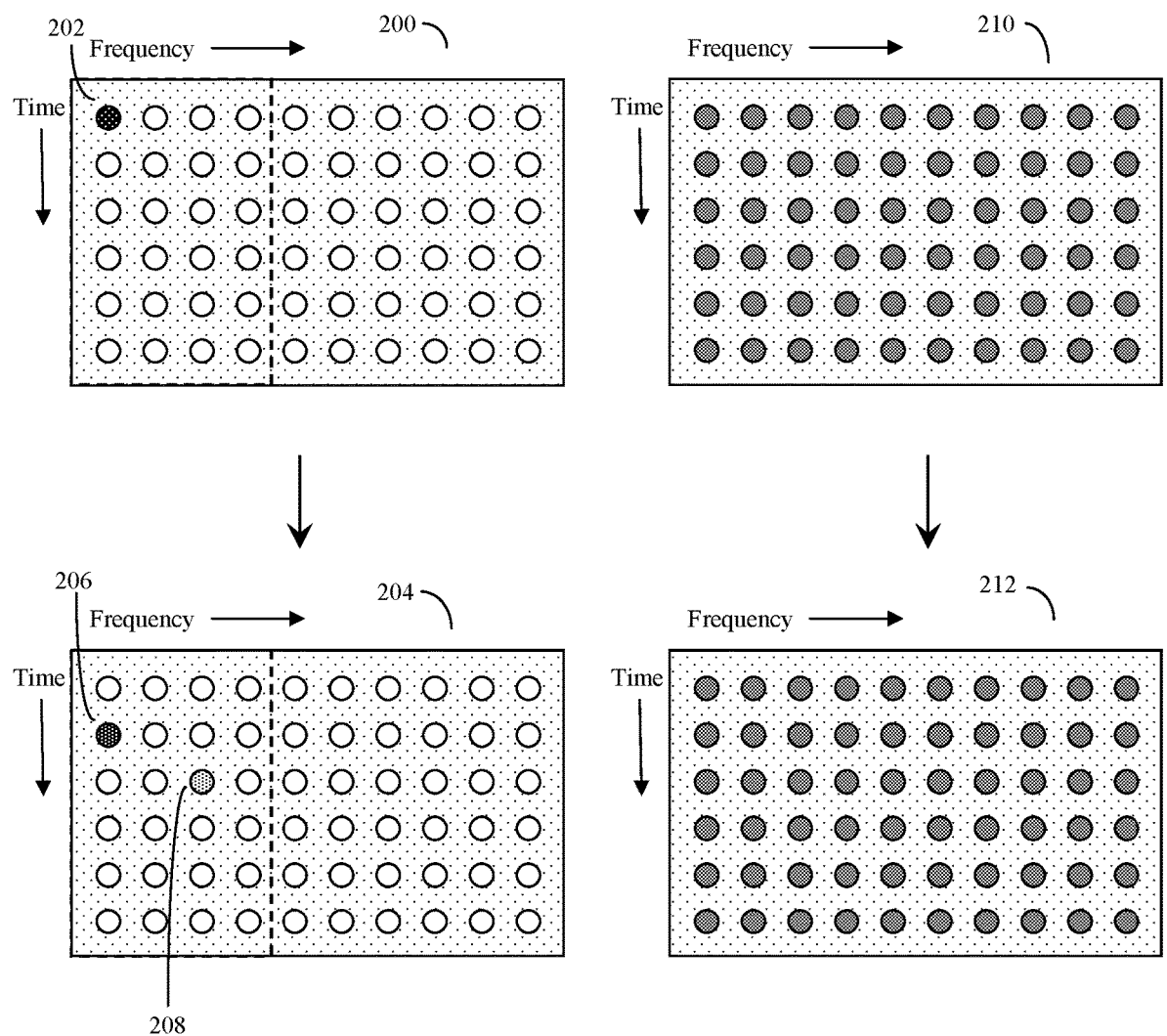
FIG. 2 shows how OTFS pilot symbol waveform bursts, transmitted at a particular OTFS time and frequency offset bin, and in some embodiments surrounded by various "clear" OTFS time and frequency bins, can be used to help determine channel response parameters.
Figure 3:
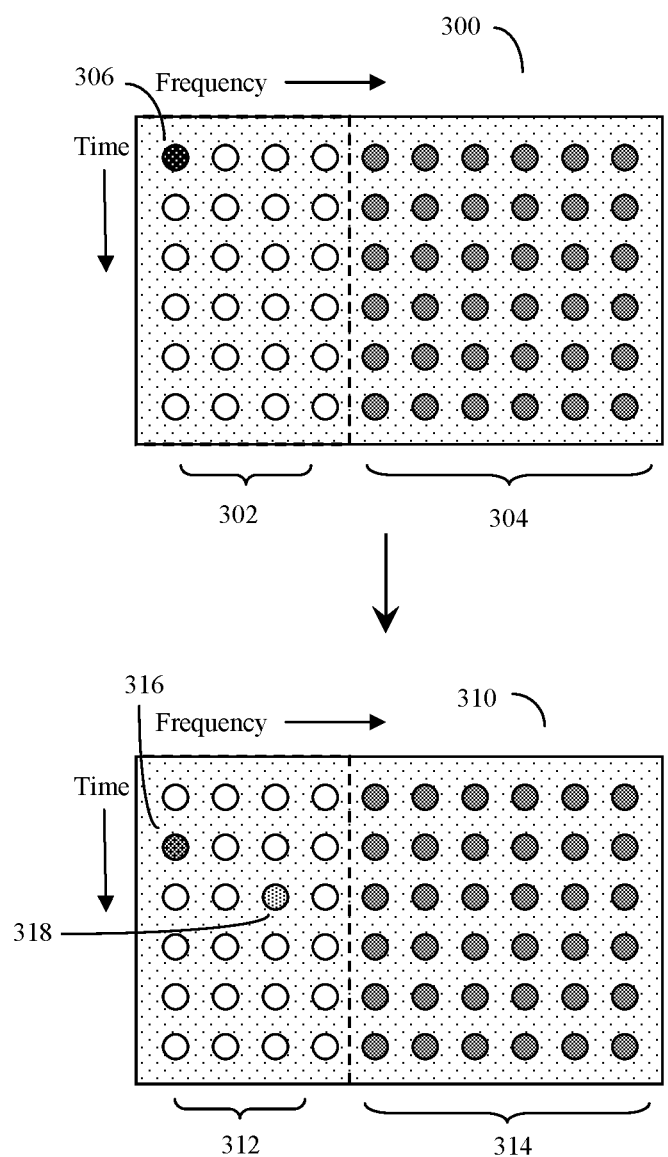
FIG. 3 shows use of a mixed OTFS data frame with some portions of the data frame being utilized for OTFS pilot symbol waveform bursts for channel response parameter purposes, and other portions being utilized for the OTFS "data payload".

An example of one embodiment of these pilot symbol waveform bursts, here within an N·M OTFS data frame (here 6×10 is drawn) is shown in FIGS. 2 and 3. Here the white circles can represent OTFS time and frequency bins with zero energy, while darker circles can represent OTFS time and frequency bins with pilot symbols or other OTFS energy and data being transmitted in these OTFS time and frequency bins.

In FIG. 2 (200), one original pilot symbol burst (202) is transmitted by transmitter (102) at time zero and with zero OTFS frequency shift and zero Doppler shift (relative to some standardized base frequency). As previously discussed, some of the energy from this original pilot symbol burst (110, 202) may travel directly to receiver (104) via path (112) at a later time "t" dependent on the distance between transmitter (102) and receiver (104). However some of the energy from the original pilot symbol burst (110, 202) may also reflect off of moving reflector (106). Because these waveforms travel a longer distance to reach the receiver (114a+114b), the reflected waveforms arrive at a later time. Because in this example, the reflector (106) is also moving with velocity (108), the reflected waveforms are also frequency shifted by the time that they (208) arrive at the receiver (104). The resulting channel convoluted pilot symbol waveforms as detected by receiver (104) are thus represented as the combination of the direct waveforms (112, 206) and further time delayed and frequency shifted reflected waveforms (114b, 208).

If, however, nearby OTFS time and frequency bins are kept clear (i.e. zero signals or known reference signals are transmitted), then the computational burden on the receiver to determine the channel response parameters and the corresponding deconvolution parameters is greatly reduced (simplified). This is because each OTFS time-frequency bin that has unexpected signal energy can be assumed by the receiver to be result of some aspect of the channel's structure, and the receiver can also assume that for at least a short period of time (possibly only a fraction of a second if reflector 106 is moving), all signals in all OTFS time frequency bins will be distorted to the same amount.

By contrast, consider the burden on the receiver (e.g. the receiver processor) if the transmitter is transmitting nothing but unknown (to the receiver) OTFS symbols on all OTFS time and frequency bins as is the case in FIG. 2 (210). As a result, the receiver (104) will also receive nothing but further unknown (until deconvoluted and solved for) channel convoluted OTFS symbols on all OTFS time and frequency bins as well (212). This greatly reduces the number of simplifying assumptions that the receiver processor can make, and the computational burden is thus correspondingly greater. It still may be doable (indeed the earlier patent applications such as Ser. No. 13/430,690 previously discussed ways to do this), but the problem is more complex and the possibility of error is correspondingly greater.

Thus according to at least some embodiments of the invention, the transmitter can transmit known pilot symbols (often accompanied at nearby or contiguous OTFS time-frequency bins with known or zero energy OTFS waveform signals). In this situation, then the at least one wireless receiver (104), can receive this at least one channel convoluted pilot symbol waveform burst (e.g. 206 and 208, again formed from the combination of direct signals 112 and reflected signals 114b), and use at least one processor (nominally a receiver based processor) to deconvolute this at least one channel convoluted pilot symbol waveform burst.

The (usually receiver) based processor can then automatically determine the channel response parameters of the multi-dimensional data channel (100) between and surrounding (e.g. connecting) the at least one wireless transmitter (102) and at least one wireless receiver (104).

The receiver can then assume that these channel response parameters will be stable for at least some period of time (at least a fraction of a second), use these channel response parameters to compute the corresponding deconvolution parameters, and thus in effect use these channel response parameters (or corresponding deconvolution parameters) to further deconvolute these and other received channel convoluted OTFS waveform bursts.

Thus consider FIG. 3. In this figure, part (302) of the N·M matrix (300) has been reserved by the transmitter and receiver for pilot symbols and some surrounding clear OTFS time and frequency bins, and part (304) (here a square 6×6 matrix) has been reserved for transmitting standard OTFS data symbols. So transmitter (102) transmits both a pilot signal (306) at a defined OTFS time and frequency bin, as well as a 6×6 matrix of normal OTFS data symbols at a plurality of different time and frequency bins (304). The OTFS signals (110) then transit though the data channel (100) according to paths 112 and 114a and 114b as before, and a convoluted form of these signals (310) are thus received by receiver (104).

Here, however, receiver (104) can first solve for the pilot symbol channel convolution parameters by analyzing the channel convoluted pilot symbol waveform burst (e.g. 316 and 318, again formed from the combination of direct signals 112 and reflected signals 114b). The processor can determine the appropriate deconvolution parameters, and then apply them to the rest of the received OTFS signals (314).

Error Detection Methods

In some embodiments, it may also be desirable to implement one or more different error correction methods. Here, for example, at least some of the transmitted OTFS symbols can be error detection or error correction and correction OTFS symbols. Here various error detection schemes can be used, which can be very simple parity bits, but often will be more complex error detection codes capable of at least some degree of redundancy and error correction as well. These schemes can include forward error correction (FEC) codes with error-correcting code (ECC), backward error detection schemes with automatic repeat request (ARQ), and the like. Various schemes such as checksums, hash functions, cyclic redundancy checks, as well as hybrid error schemes such as hybrid ARQ (e.g. combinations of various ARQ and FEC codes can also be used. Methods such as Reed-Solomon codes, Turbo codes, low-density parity check codes (LDPC) and other schemes may also be used.

Typically the transmitter (102) will use its transmitter processor to analyze the data about to be transmitted, and transmit the data as OTFS symbols with various error correction OTFS symbols included as well. The receiver will often use at least one receiver processor to, after at least some of the various transmitted OTFS symbols have been received, use the error detection or error correction OTFS symbols to, for example, detect when OTFS symbol transmission errors are exceeding a predetermined maximum acceptable error level. Usually, such a high level of errors (e.g. exceeding the predetermined maximum acceptable error level) can be taken as an indicator that the channel response parameters (and corresponding deconvolution parameters) have become suboptimum.

Consider for example, FIG. 1 where moving reflector (106) may have changed position over time due to its velocity (108). The system may have originally (possibly only a few seconds or a fraction of a second earlier) transmitted one or more pilot symbols (202, 306), according to the schemes illustrated in FIGS. 2 and 3, to that may have adequately characterized the channel response parameters (e.g. determined by 206, 208 or 316, 318) of the multidimensional data channel (100) at an earlier time point. However now, possibly only a few seconds or fractions of a second later, reflector (106) may have changed position or velocity enough so that the earlier channel response parameters (e.g. as determined by 206, 208 or 316, 318) are no longer accurate. One of the first ways that this will show up is when the system's error detection/error correction scheme reports that errors in the error detection or error correction OTFS codes are now reporting errors that are starting to exceed a preset limit.

The receiver can use this information to then determine that the channel response parameters are now suboptimum. Various types of corrective action are possible. The receiver (104) itself, without further communication with the transmitter (102), can attempt on its own to recalculate the channel response parameters and look for an alternate set of parameters with a reduced amount of errors. Alternatively or additionally, the receiver (104) can also transmit a request to the transmitter (102) to transmit one or more new pilot symbols (e.g. refresh the process previously shown in FIGS. 2-3), which will allow the receiver to again calculate a new set of channel response parameters (and corresponding deconvolution parameters) more appropriate to the present location and velocity of reflector (106). As yet another scheme, the receiver (104) can also transmit its present set of channel response parameters, either with or without the receiver's error code results, to transmitter (102). The transmitter in turn could then make use of knowledge of what the receiver is detecting (e.g. the receiver channel response parameters and associated errors) to also change the transmitters OTFS modulation scheme or other variables (e.g. MIMO antenna configuration, burst characteristics, error codes, polarization, and other schemes as will be discussed).

In this later case, suppose that due to a particular location or velocity of reflector (106), certain OTFS time delays or frequency shifts, or combinations of time delays or frequency shifts, were found to be either unusually good or unusually bad. The transmitter can make use of the receiver transmitted channel response parameters and corresponding error codes to select various combinations of OTFS time shifts and frequency shifts to either avoid problematic combinations of various time shifts and frequency shifts, or alternatively to favor unusually good (e.g. reduced interference) combinations of various time shifts and frequency shifts.

In either event, in at least some of these embodiments, the error codes can be used to automatically inform either the receiver or the transmitter, or both the transmitter and receiver that the channel response parameters are suboptimum, and to initiate various types of corrective action such as the actions discussed above.

Alternatively and or additionally, the error detection or error correction codes can also be used by the receiver (usually using at least one receiver processor) to use the error detection or error correction OTFS symbols to automatically correct errors in other OTFS symbols.

Interleaving of Different OTFS Burst Types and Data Frame Types

The OTFS system operates, in part, by a modified form of echo location that uses bursts of OTFS waveforms to better characterize the structure of the data channel, and better estimate channel response parameters and corresponding deconvolution parameters. Here some of the aspects of the time length of the various OTFS wireless waveform bursts, as well as various ways in which OTFS symbols can be packaged into various data frames for subsequent transmission, will be discussed in more detail.

As a general rule, often the plurality of mutually orthogonal time shifted and frequency shifted wireless OTFS waveform bursts can be varied and selected by the system (often automatically by the transmitter's processor, sometimes using information obtained from the receiver). Some of the ways that the OTFS waveform bursts can be selected can include the desired time latency of the system (e.g. how fast can the system transmit useful data between the transmitter and the receiver), the bandwidth allocated to the OTFS waveforms (here, regulatory considerations, such as bandwidth allowed by governmental agencies such as the Federal Communications Commission (FCC) may be highly relevant). As previously discussed, the OTFS waveforms may also be varied according to the observed or anticipated channel response parameters.

There is not necessarily a "one size fits all" criteria here, and even within a communications session between the same transmitter (102) and the same receiver (104), some OTFS symbols may be transmitted according to a first set of selection criteria, while other OTFS symbols may be transmitted according to a different set of selection criteria.

For example, in some embodiments, the plurality of mutually orthogonal time shifted and frequency shifted wireless OTFS waveform bursts may be characterized by burst time durations (It that can vary according to various factors such as the desired transmission latency time and/or the spatial distribution of reflectors in said communications channel. For example, if latency is not a problem, and there are relatively few reflectors (106) in the communications channel, it may be desirable to choose longer burst time durations because the in-between each burst with time length βt will normally be some quiet time δt where little or no data is being transmitted. Thus choosing longer bursts can help minimize quiet time δt. Alternatively if there are a lot of reflectors (106) in the data channel, or if lower latency is preferred it may be more important to use short burst times βt to help the system better characterize the channel response parameters, even though the overall data transmission rate in bits per second may be lower.

Similarly the frequency bandwidth of the bursts (e.g. burst frequency bandwidth) δf can also be varied. In addition to changing this according to government regulations and commercial considerations, the burst frequency bandwidth may also be varied by the system (often automatically) according to factors such as the anticipated or observed distribution of speeds and locations of various receivers, transmitters, and reflectors in the communications channel.

Keep in mind that each OTFS burst will be composed of a plurality of time shifted and frequency shifted OTFS waveforms. Increasing the range of frequency shifted waveforms in the OTFS signal burst (and hence the frequency bandwidth δf) will improve the ability of the system to detect and respond to a greater range of velocities of transmitters, receivers, and reflectors. A very restricted OTFS system optimized for ground use only, for example, might only use a range of frequency shifts designed to accommodate Doppler shifts caused by velocities on the order of 0 to +/−100 miles per hour. It might be deliberately designed to disregard Doppler shifts caused by fast flying airplanes (acting either as transmitters, receivers, or reflectors) traveling at +/−600+ per hour speeds.

Similarly an OTFS system optimized for rural use might be designed to accommodate much longer distances and (corresponding range of speed of light imposed time delays) between transmitters, receivers and reflectors (e.g. 10 miles, 20 miles, 30 miles or more). Here, the density of reflectors is low, and the time shifts (due to the speed of light) involved will be higher. One way to optimize for this situation may be to use a smaller number of frequency shifts spread out over a longer range of times (needed because of the long distances involved in this data channel structure), or to employ longer time intervals between bursts so that delayed signals and echoes from distant receivers, transmitters, and reflectors can be properly detected and analyzed.

By contrast, an OTFS system optimized for urban use may be designed to accommodate a high density of reflectors (e.g. many buildings per city block) and lower signal path lengths between transmitters and receivers (e.g. 1, 2, 3 miles) and reflectors. Here the bursts might use a larger number of shorter time shifts (this can give the system a greater ability to discriminate between closely spaced reflectors), but the separation time between bursts can be shorter because the need for long distance operation is less.

Additionally, the number of OTFS data symbols transmitted per burst can also be varied by the system. The number of transmitted OTFS symbols, for example, may vary according to either βt and/or δf. Here again, the βt and/or δf burst characteristics can be selected by the system (again often automatically, using at least one processor and suitable software) according to various considerations including channel response parameters, desired transmission latency time, and desired number of OTFS data symbols to be transmitted per burst.

Multiple-Input and Multiple-Output (MIMO) Antenna Schemes

MIMO (e.g. various Multiple-input and Multiple-output (MIMO) antenna schemes) have been used for wireless communications methods, often for various beam forming purposes for a number of years. The basic concept is to use arrays of either spatially separated transmitting antennas, receiving antennas, or both to direct wireless signals in preferred directions (e.g. concentrate more wireless energy in the direction of the receiver or transmitter).

Some prior art methods also rely on some sort of knowledge of the channel state information between and surrounding (e.g. connecting) the receiver and transmitter. Here for example, if a receiver is known (by any method) to be located in a certain direction, then the transmitter can be precoded to form its beam in the direction of the receiver.

The previously discussed OTFS concepts are generally both highly compatible with various MIMO antenna configurations and schemes, and indeed when combined with MIMO can be used to achieve higher levels of performance than was previously possible using prior art wireless communication modulation schemes and MIMO schemes alone.

Because, as previously discussed, OTFS methods allow the underlying structure of the data channel, and its corresponding impact on the channel response parameters, to be very precisely determined, often as a function of time; this channel response parameter data can be combined with MIMO methods to greatly enhance the capabilities of the system.

Using MIMO to Shape the Spatial Distribution of OTFS Wireless Waveforms

Figure 4:
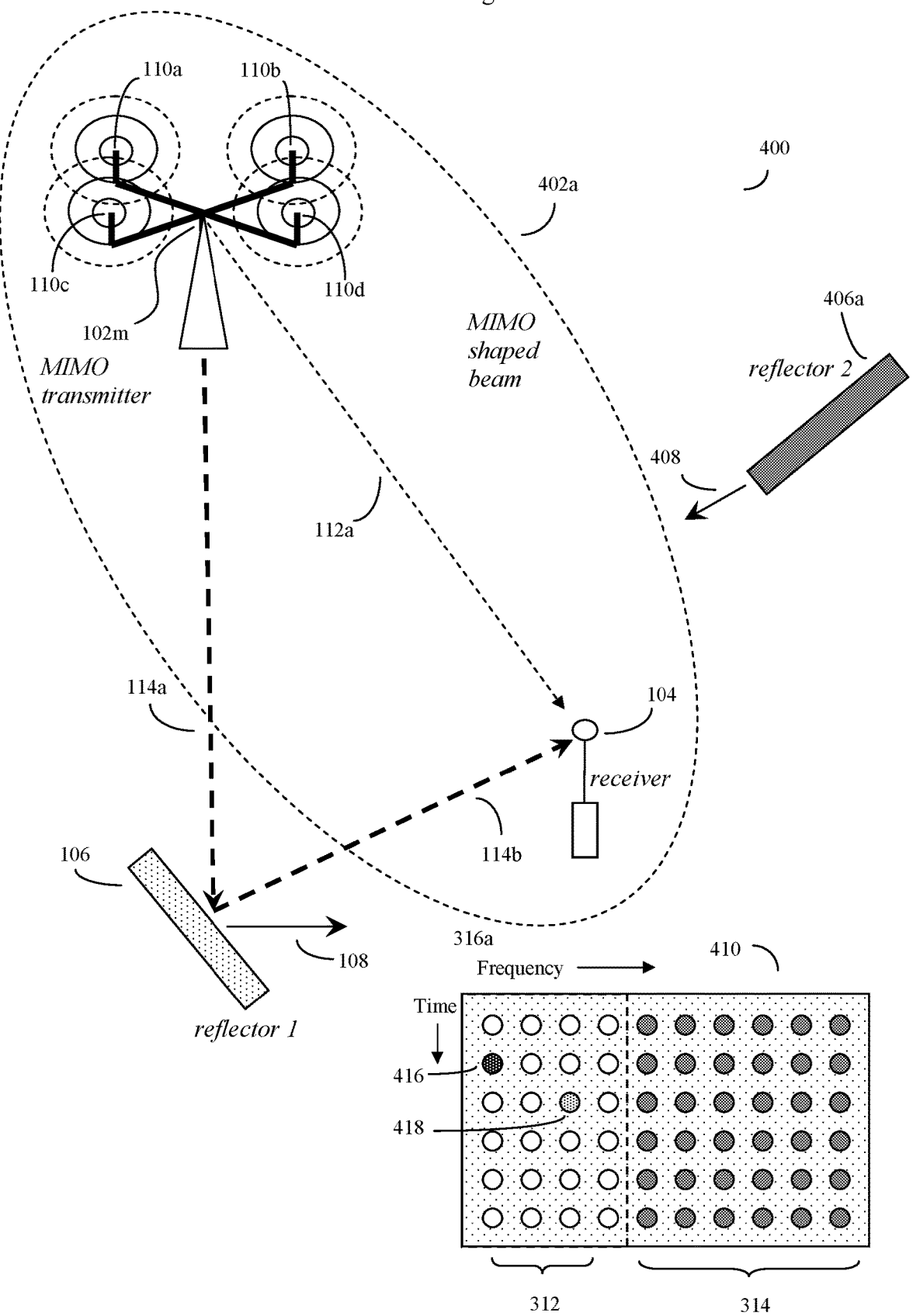
FIG. 4 shows an OTFS MIMO embodiment in which a MIMO OTFS transmitter forms a wireless beam of energy directed towards an OTFS receiver of interest.

FIG. 4 shows a more complex version of the abstract multidimensional data channel model (400) previously shown in FIG. 1 (100). Here transmitter (102m) is now a MIMO transmitter with four spatially separated antennas, transmitting a plurality of OTFS symbols as a plurality of OTFS waveforms, where one set of waveforms (110a, 110b, 110c, 110d) is from each antenna (110a, 110b, 110c, 110d). Here the OTFS MIMO transmitter has been configured to transit the four sets of waveforms in a phased arrangement as to form a beam (402a) that directs the wireless OTFS waveforms preferentially in the direction of receiver (104). The wireless reflector (106) moving at velocity (108) remains as per FIG. 1, as do direct paths (112a) and one or more reflected paths (114a, 114b).

Unlike FIG. 1, however, assume that either a second reflector (reflector 2) (406a) is moving in a direction (408) that will eventually (but not yet) block the direct path (112a) between the MIMO transmitter and receiver (104); or alternatively assume that either the MIMO transmitter (102m) or the receiver (104) are moving in the direction of reflector 2 (406a) so as again to eventually have reflector 2 block direct path 112a (but not yet).

In FIG. 4, if the OTFS system was using pilot signals according to the methods previously discussed in FIGS. 2 and 3, then assuming that reflector 2 is still too far away to make any substantial impact on the system, then the resulting channel convoluted pilot symbol waveforms as detected by receiver (104) can, as per FIGS. 2 and 3, still can be represented as the combination of the direct waveforms (112a, 416) and the time delayed and frequency shifted reflected waveforms (114b, 418). Here, perhaps due to MIMO beam forming, the intensity of (418) may be a bit lower than in FIGS. 1 and 3, but otherwise the situation is much as previously shown in FIG. 1 and FIGS. 2 and 3.

In this configuration then, at least one wireless transmitter (here 102m) and/or wireless receiver (either 104 or FIG. 6 104m) have multiple antennas positioned at different locations generally on or near the location of the wireless transmitter or wireless receiver. Here assume that these multiple antennas share the same velocity as of their respective wireless transmitter or wireless receiver(s).

In addition to standard MIMO functionality, the system can perform enhanced OTFS MIMO functionality by, for example, using these multiple antennas to do novel MIMO functions. For example, the system can use the previously described methods (e.g. pilot symbol bursts and the like) to determine the channel response parameters of multidimensional data channel (400). For example, the receiver (104) could transmit its observed channel response parameters (e.g. obtained from 416, 418) back to transmitter (102m) and transmitter (102m) can use these to further direct its MIMO antennas (110a-110d) to send more wireless energy along direct path (112a) according to MIMO shaped beam 402a. Alternatively if receiver (104) is a MIMO receiver then receiver could also use its multiple antennas to have higher sensitivity along the direction of direct path (112a).

In either case, the OTFS MIMO system can use the channel response parameters to shape at least the spatial distribution of the transmitted or received wireless waveform bursts.

Figure 5:
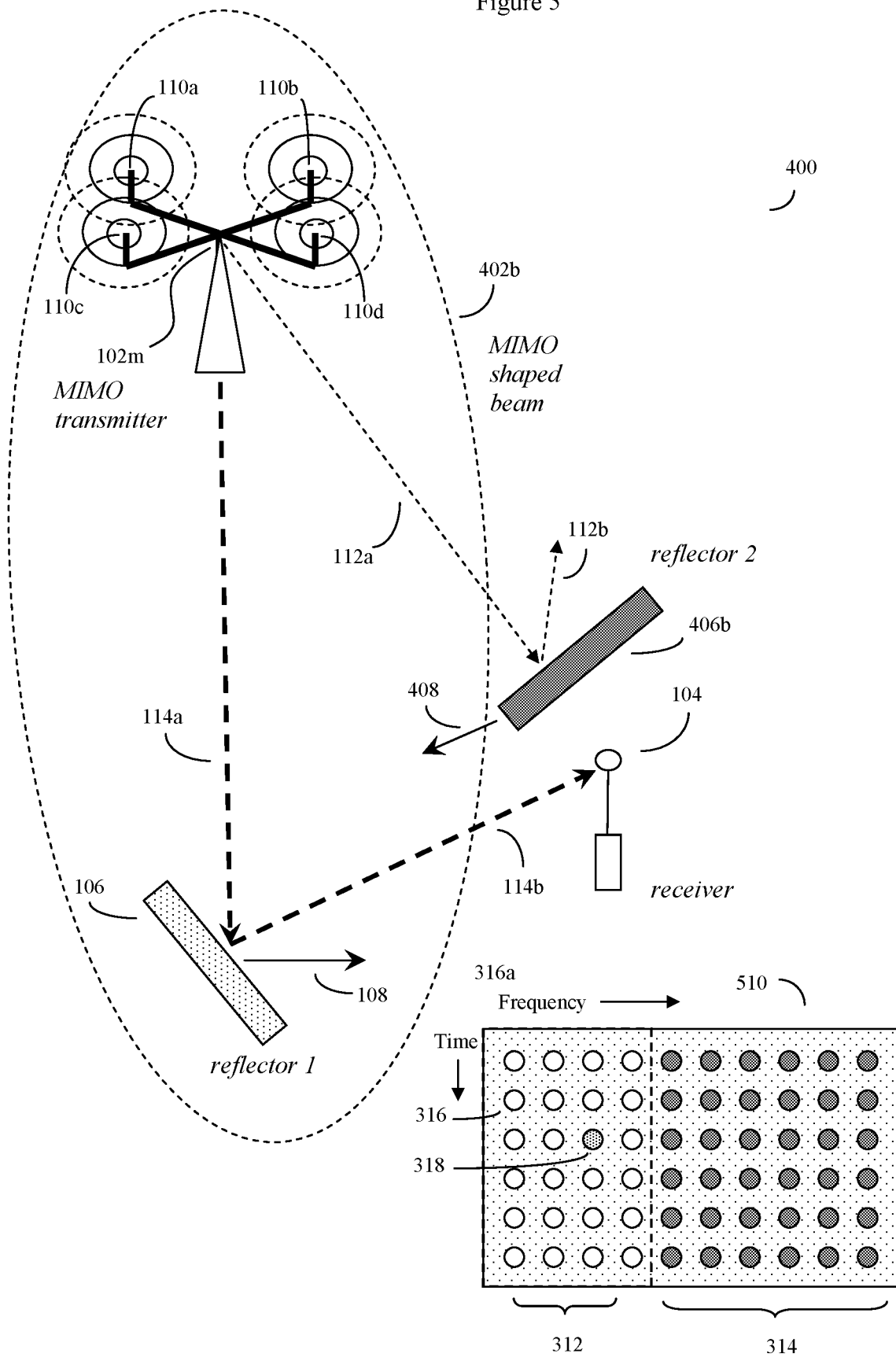
FIG. 5 shows an alternative OTFS MIMO situation, where a new reflector (reflector 2) is now preventing wireless signals from traveling directly from the MIMO OTFS transmitter to the OTFS receiver. The OTFS system can automatically detect the problem (here by using OTFS pilot symbols, possibly assisted by the invention's error detection methods, to detect changes in the channel response parameters) and then direct the transmitter's MIMO antennas to form the transmitted beam in the direction of a useful reflector, thus making contact with the receiver using indirect reflected signals.

To really see how OTFS techniques can be used to enhance MIMO (and synergize well with MIMO) consider now how the OTFS MIMO system can operate in a different situation shown in FIG. 5.

In FIG. 5, now either the second reflector (now called 406b) has moved to block the direct path (112a) between MIMO transmitter (102m) and receiver (104), or alternatively the MIMO transmitter (102m) or receiver (104) has moved so that reflector (406b) is now blocking the direct path (112a) between the transmitter (102m) and receiver (104). The only path, or at least main path that remains open is the path (114a, 114b) where the signals from MIMO transmitter (104m) now are reflected off of reflector 1 (106), and are both time delayed and Doppler frequency shifted due to the velocity (108) of reflector 1.

Note that as previously discussed for FIGS. 2 and 3, these changes in the structure of multidimensional data channel (400) can be very intelligently analyzed using OTFS methods. For example, OTFS pilot symbol burst techniques would show that there is now almost no energy being received at the OTFS time shift and frequency shift bin (316) that earlier corresponded to direct path (112, 112a); however there are still relatively strong OTFS signals being received according to the time delayed and frequency shifted reflected waveforms (114b, 318). The sensitivity of such methods can be further improved by using various error codes and error detecting thresholds to detect problems far in advance of full loss of signal on a particular pathway.

Here the OTFS system can use the information from these channel convoluted pilot symbol waveforms in various ways. In one embodiment, the receiver (104) may again transmit its observed channel response parameters (e.g. as determined by 316, 318) to MIMO transmitter (104m) and MIMO transmitter (104m) (often after suitable analysis of the channel response parameters using a transmitter processor) can then direct the MIMO antennas (110a, 110b, 110c, 110d) and OTFS waveforms to shift the direction of the beam (402b) to now favor reflection off of reflector (106) and use of indirect path (114a, 114b).

Figure 6:
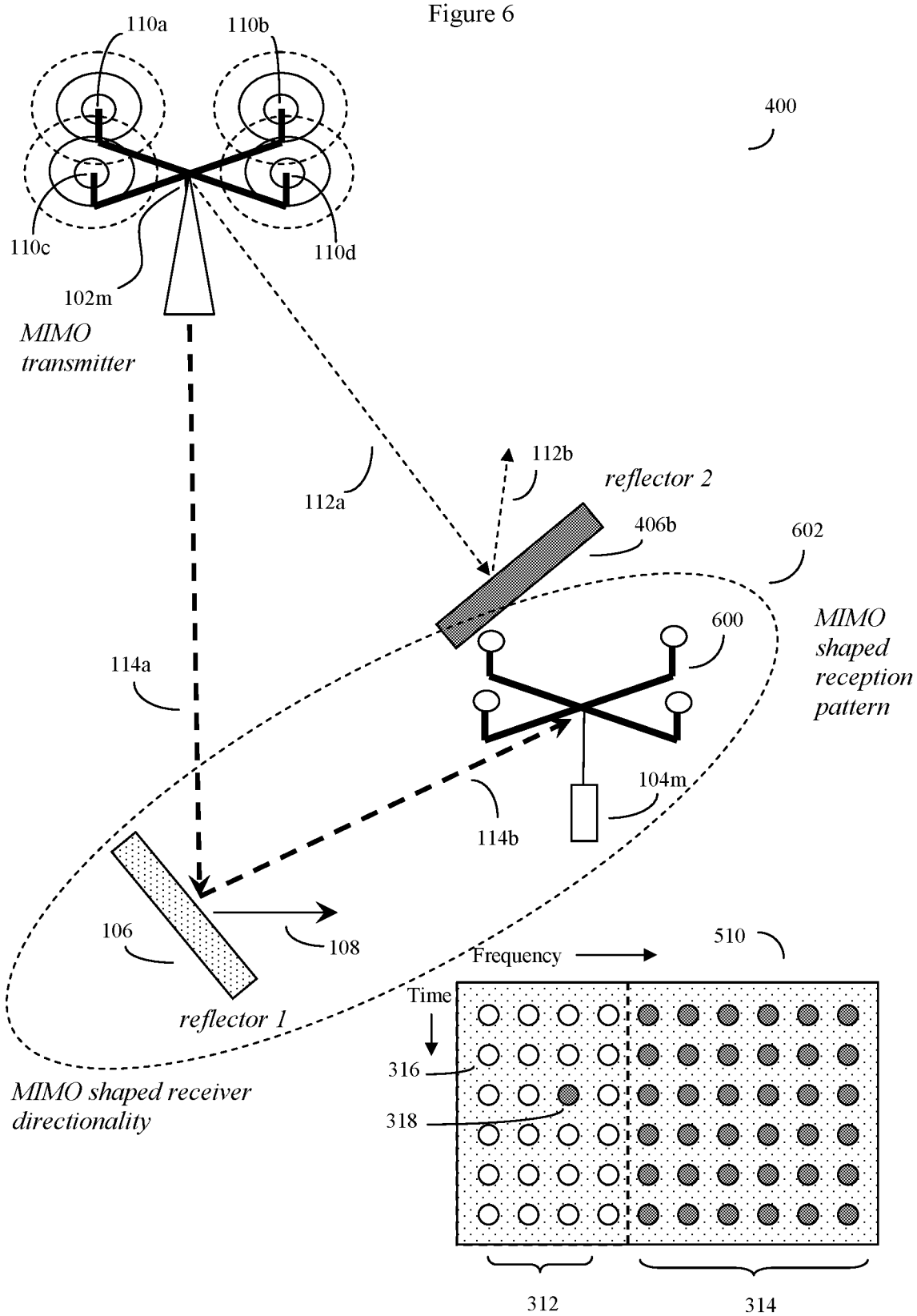
FIG. 6 shows another alternative OTFS MIMO situation, similar to that shown in FIG. 5 above. Here however, the OTFS receiver is a MIMO OTFS receiver, and the receiver has used the changes in the channel response parameters to direct the receiver's MIMO antennas to preferentially receive in the direction of the useful reflector.

Alternatively, as is shown in FIG. 6, if the receiver (104m) is a MIMO receiver with its own set of multiple antennas, then receiver (104m) (usually controlled by at least one receiver processor) can itself directly analyze the channel response parameters, and configure its own receiver MIMO antennas (600) to have preferential sensitivity (602) in a direction towards reflector 1 (106) and indirect path (114b). Of course even better results may be obtained if both the receiver and the transmitter both have MIMO antennas, and both use MIMO methods to form optimal beams of wireless transmission and optimal directions of wireless reception.

Once, as detected by various combinations of error detecting techniques, channel response parameter techniques, pilot signals, and the like, interfering reflector 2 (406b) moves out of position (and this may only be a few seconds later, or even quicker), the system can then dynamically reconfigure itself back to the earlier configuration shown in FIG. 4, or other configuration as most appropriate. Indeed, by continually reconfiguring itself, often multiple times per second in response to changes in the channel response parameters, the OTFS system can take active steps to prevent signal fading, and to try to ensure high quality signal acquisition over a broad range of adverse and constantly changing channel structures. At the same, time, because the system has continuous high quality knowledge about the channel response parameters and the structure of the multidimensional data challenge, the need to use the less satisfactory prior art statistical methods can be reduced or eliminated.

Different Streams from Different MIMO Antennas

In some embodiments, either additionally or alternatively to using MIMO for beam shaping applications, at least some of the OTFS system's different MIMO antennas may be used for transmitting and/or receiving, often on a simultaneous basis, different OTFS waveform bursts. These methods can be used to send the capabilities of the OTFS system in order to send more data over a given period of time.

One natural application of this approach can be, for example, an OTFS cellular phone tower (e.g. cell site, cell tower, base transceiver station, base station, base station site, and the like) communicating with multiple OTFS equipped cellular phones. In this specific example, the cellular phone tower may have multiple antennas, however at least some of the OTFS equipped cell phones (for example handheld cell phones) may have only one antenna, while other OTFS equipped cell phones (for example cell phones mounted in a vehicle) may also be MIMO devices with multiple antennas of their own.

In this embodiment, generally either the wireless transmitter and/or the wireless receiver will have multiple antennas (hence the MIMO designation). At least some of these various multiple MIMO antennas will be positioned at different locations on or near the wireless transmitter and/or receiver. These multiple MIMO antennas will have the same velocity of their respective associated wireless transmitter or wireless receiver.

These multiple antennas (at either the transmitter or receiver) can be further divided into at least a first subset of antennas and a second subset of antennas. Here the system is configured so that the first subset of multiple antennas transmits or receives a first set of wireless OTFS waveform bursts, and the second subset of antennas can (often simultaneously) transmit or receive a second set of OTFS waveform bursts. The first set of wireless OTFS waveform bursts will typically differ from the second set of wireless OTFS waveform bursts.

Note that this later approach can be still be compatible with the MIMO beam shaping approaches discussed previously. For example, consider an OTFS cellular phone tower with eight antennas communicating with two different remote OTFS cellular phones. The OTFS cellular phone tower could, for example, at one time partition four of its antennas to communicate, using MIMO beam shaping techniques, with a first OTFS cellular phone using a first set of wireless OTFS waveform bursts while simultaneously partitioning a different set of four antennas to simultaneously communicate, using MIMO beam shaping techniques, with a second OTFS cellular phone using a second set of wireless OTFS waveform bursts. The same cellular phone tower could, perhaps a few seconds later, dynamically reconfigure its MIMO antennas to then simultaneously talk to eight different OTFS cellular phones by allocating one MIMO antenna to each different OTFS cellular phone, and so on.

In this application as well, the various OTFS concepts of determining channel response parameters, error detection and correction, and the like can further be used by the MIMO OTFS transmitters and/or MIMO OTFS receivers to intelligently optimize the allocation of MIMO antennas, OTFS time shifts, OTFS frequency shifts, OTFS burst length, OTFS burst bandwidth, and the like to come up with optimal combinations to handle the particular situation at hand.

MIMO Full Duplex Operation

The OTFS concepts disclosed herein can be used for both unidirectional communications (only one way), half-duplex communications (e.g. communications in both directions, but only one direction at a time), and full-duplex communications (e.g. communications in both directions at the same time). Here we will discuss some full-duplex embodiments in further detail.

In one full-duplex operation embodiment, at least one set of wireless transmitters and wireless receivers are configured in a first full duplex device, and at least one set of wireless transmitters and wireless receivers are configured in a second full duplex device.

Here at least the first duplex device (e.g. a cellular phone tower) is a MIMO device with multiple antennas positioned at different locations on or near the first full duplex device (e.g. the cellular phone tower may have multiple antennas). These multiple MIMO antennas will often share the same velocity of this first full duplex device (e.g. if the cellular phone tower is stationary, typically the MIMO antennas are stationary).

Note however that in alternative embodiments, other MIMO antenna configurations where the MIMO antennas may have their own movement, such as rotating antennas and the like, are also contemplated. In the present discussion, however we will focus on "stationary" embodiments (e.g. MIMO antennas that share the same velocity as their associated transmitter/receiver).

Here, the first duplex device's wireless transmitter(s) and wireless receiver(s) are each coupled to at least some of the first duplex devices MIMO antennas (multiple antennas). The first full duplex device will further be configured (usually under processor control with suitable software) to automatically control the coupling between its multiple (MIMO) antennas and its wireless transmitter(s) and wireless receiver(s) so as to mitigate interference between the device's own wireless transmitter(s) and wireless receiver(s).

This is important because often the first device's transmitter(s) and receiver(s) will be transmitting and receiving to and from the second full duplex device at the same time. It is thus undesirable for the first device's transmitter(s) to interfere (e.g. have cross-talk) with the first device's receiver(s). However although this "cross talk" is undesirable, simple methods to mitigate the cross talk by, for example, turning down the sensitivity of the first full duplex device receiver(s) to minimize "cross talk" will also have the undesirable effect of also turning down the sensitivity of the first full duplex device receiver(s) to pick up signals from outside transmitters, such as the second full duplex device transmitter(s).

So the problem is one of minimizing cross-talk, while simultaneously also optimizing the sensitivity of the first device's receiver(s) while receiving transmissions from the second full duplex device's transmitter(s). According to the invention, these problems can be addressed by various methods, including:

Controlling the coupling between the transmitting and receiving antennas by arranging the distribution of the locations of the first full duplex device's multiple (MIMO) antennas. For example, this can be done by positioning the receiving antennas further away from the transmitting antennas, interspersing the transmitting antennas with other MIMO antennas or other structures in between and surrounding (connecting) the transmitting antennas and the receiving antennas.

Alternatively or additionally, controlling the coupling between the transmitting and receiving antennas by controlling (either by dynamically reconfiguring, or else continually operating electrical components) the radio frequency (RF) or electrical coupling between the first full duplex device's multiple (MIMO) antennas and at least one of the first full duplex devices wireless transmitter(s) or receiver (s).

Or as a third alternative, alternatively or additionally amplifying and digitizing the RF signals to and from the first full duplex device's multiple (MIMO) antennas, and using at least one processor (e.g. a digital signal processor) to digitally mitigate the interference/cross-talk between the transmitting and receiving antennas.

Here, for example, when a transmitter transmits in a full duplex device, not only is there a potential direct path between the transmitter and the receiver, but there are also various indirect paths, such as echo reflections off of nearby structures, that can also contribute to interference/cross-talk. Here the invention's OTFS methods can also be used to monitor the status of these various echo reflections. Thus according to some full duplex embodiments of the invention, the OTFS method derived channel response parameters and equalization methods can be used to digitally mitigate the interference/cross-talk between the transmitting and receiving antennas. In some embodiments, this digital mitigation may be done by using the OTFS method derived channel response parameters to configure an equalizer configured to correct the received signal for distortions caused by interference/cross-talk from the transmitter.

Alternatively or additionally, the channel response parameter information obtained by OTFS methods may be used by the OTFS transmitter to help mitigate at least some of the more troublesome echo reflections that are causing cross talk. Here the digital mitigation of the interference/cross-talk between the transmitting and receiving antennas can be done by using the OTFS derived channel response parameters to "precode" the OTFS transmitter transmissions in a manner that mitigates at least some of the more troublesome, interference/cross-talk causing, echo reflections.

Thus, in this later embodiment, at least one of the of the wireless transmitters and wireless receivers will be configured as a first full duplex device, and at least one of the wireless transmitters and wireless receivers will be configured as a second full duplex device. For at least one of these devices, such as at least the first full duplex device, this device (in addition to the other techniques discussed above), can also use OTFS methods to help further control the coupling (cross-talk) and mitigate interference between its own wireless transmitter(s) and wireless receiver(s). At the same time, this first device can still while transmit to the second full duplex device, and maintain the first device's receiver sensitivity for signals from the second device's transmitter. Here, as before, the idea is to control this coupling (cross-talk) by, either in addition to, or instead of obtaining the channel response parameters between the first device and the second device, also using OTFS methods to obtain the "self-channel response parameters". These "self-channel response parameters" are the channel response parameters of the OTFS waveform bursts that travel between the first device's wireless transmitter(s) and the first device's own wireless receivers. Once this is obtained, the first device, for example, can essentially perform "self-equalization" or "self-precoding) and use it's at least one processor and self-channel response parameters to digitally mitigate this coupling (cross-talk, interference).

Using Polarized OTFS Waveforms for Improved Channel Response Parameter Determination All electromagnetic waves, including the wireless (e.g. radio) waves used for the present OTFS communication purposes, are polarized to some extent, but often the various directions of polarization are incoherent and thus the net polarization of the wireless waves may be minimal.

One interesting and useful aspect of polarization, however is that when polarized electromagnetic waves (wireless signals) reflect off of various surfaces, the polarization of the reflected wireless signal may differ from the polarization of the incoming wireless signal depending on the properties of the reflecting surface, and other factors such as the geometry (e.g. various angles of incidence and reflection) of the situation.

In the case of the OTFS technology disclosed herein, the fact that polarization may be altered by different reflecting materials and different geometries of reflection can be further exploited to provide still more information regarding the structure of the multi-dimensional data channel, and to provide still more information regarding the channel response parameters of the multidimensional data channel.

In this polarization enhanced embodiment, the OTFS transmitter(s) (e.g. 102) transmit polarized originally transmitted OTFS waveform bursts according to at least one polarization direction. Here, however, assume that at least some of the various wireless reflectors (e.g. 106) are also polarization altering wireless reflectors that alter the polarization of the various time delayed and Doppler frequency shifted reflected wireless OTFS waveform bursts. Usually this polarization alteration will be according to a first reflector polarization operator. Because this polarization alteration is also sensitive to relative angles of the transmitter, receiver, and possibly other reflectors, in some embodiments this operator may be a polarization tensor, but for simplicity and generality, we will refer to this a first reflector polarization operator.

In this polarization enhanced embodiment, the OTFS receiver(s) (e.g. 104) may be further configured to detect the various directions of polarization in the received convoluted OTFS waveform bursts. Note that this polarization may not be uniform throughout the received burst, but may vary in some frequency regions and time regions of the burst depending on the structure of the data channel.

Thus, when the originally transmitted OTFS waveform bursts reflect off the one wireless reflector(s), at least some of the originally transmitted OTFS waveform bursts may also be polarization shifted according to (for example) this first reflector polarization operator.

The OTFS receiver can then be configured to further detect the direction(s) of polarization in the received channel convoluted OTFS waveform bursts, and further use this polarization information to further determine the channel response parameters of the multi-dimensional data channel.

In effect, polarization changes can be used to enhance the contrast between the various reflectors. In most real-life situations, where there are usually multiple reflectors, it can be non-trivial (even using OTFS techniques) to distinguish between them. Polarization methods make it easier for the OTFS system to distinguish between the different reflectors, and in turn construct a more accurate (e.g. more realistic) model of the channel response parameters. This in turn can allow the received signals to be deconvoluted better.

Using Location Determination Techniques to Retrieve Previously Stored Channel Response Parameters In many situations, for example urban environments, the location of nearly all of the major reflectors will tend to be relatively stationary, often over time periods of days, weeks, months, and sometimes even years. For example, consider a city. Although vehicles may move, otherwise the location of the major reflectors (e.g. buildings, bridges, other man-made structures) will not change at all fast. Indeed, often not much at all will happen until a building is constructed or torn down.

Another factor is that often, at least with respect to cell towers or other infrastructure sources of wireless transmitters and receivers, even the cell towers (102) will tend to remain in place for long periods of time, such as times of a year or even more.

This embodiment of the invention is thus based on the insight that, neglecting vehicles (which often are relatively small wireless reflectors when compared to buildings), it is thus feasible to construct a "map" (e.g. location indexed computer database) of how the channel response parameters of a particular environment vary as a function of the location of the OTFS base station (which often will be in a fixed position, here assume 102m is a base station) and the location of the OTFS receiver or transceiver (104) or other OTFS mobile device (e.g. OTFS mobile transmitters, transceivers, and the like).

If this map of channel response parameters is stored in a computer database (which can be located on the OTFS transmitter, the OTFS receiver, or remotely), then a mobile OTFS device (104) can determine its present location by any means (including automatically making use of Global Positioning Signals (GPS), internal navigation techniques, triangulation of radio sources, identities of known local WiFi hotspots, and the like) and then use its processor to look up previously stored channel response parameters according to the mobile OTFS device's present location.

Similarly if the stationary cell tower (102m) knows the location of the mobile OTFS device (104), then the stationary cell tower (102m) can also look up the probable channel response parameters of the mobile OTFS device in the computer database (channel response parameter maps) as well.

Thus using this scheme, even the first burst of communications between a mobile OTFS device (104) and another OTFS device, such as a stationary cell tower (102) can start with reasonably optimized channel response parameters on both ends. The systems can further optimize as time goes on (e.g. start with an initial model [set of channel response parameters] that neglects moving reflectors, and then add moving reflectors later on in a later more refined set of improved channel response parameters).

Although to get the concept across, the initial discussion above used an example of a stationary cell tower, in principle (although more complex), more complicated multi-dimensional channel response parameter maps (location indexed computer databases indexed by the location of two or more OTFS devices) can also be constructed and used as needed.

Put alternatively, in some embodiments, the OTFS system may operate by further creating a map database of the channel response parameters of the multi-dimensional data channel at a plurality of transmitter and receiver locations. The system can then determine the positions of at least one wireless transmitter and at least one wireless receiver, and use these positions to automatically search (usually using a processor for this purpose) this map database and retrieve at least some channel response parameters of the multi-dimensional data channel at these positions. These channel response parameters can then be used for OTFS communications purposes. For example, the map obtained channel response parameters can be used to initialize or "bootstrap" the process, and then supplemented by real time obtained channel response parameters during the communications session.

Consider, for example, a mobile OTFS cell phone (e.g. 104) located far away (e.g. at an extreme range) from its OTFS cell tower (102). If the range is too far, then even OTFS methods will eventually fail because the cell phone (104) and the tower (102) can't get lock on each other. However by using map obtained channel response parameters, the initial "let's get a lock" OTFS handshaking channel response parameters can be used to optimize the signal enough to at least get communications started. Further optimization can then follow.

Methods of Operating OTFS Transmitters

It should be evident that the various methods and systems described herein, which apply to wireless OTFS transmitters, wireless OTFS receivers, and methods in which wireless OTFS receivers and wireless OTFS transmitters can cooperate to improve signal transmission between the transmitters, thus of course also apply to methods of operating one or more OTFS wireless transmitters, as well as methods of operating one or more OTFS wireless receivers.

In general, at the transmitter level, the invention thus covers various methods of configuring, constructing, and operating one or more OTFS wireless transmitter devices, as well as the OTFS wireless transmitter devices themselves.

As a common denominator, the basic transmitter method, which can then be extended and elaborated upon according to the previously described embodiments, is a method of operating at least one OTFS wireless transmitter device. The wireless transmitter can be a software configured wireless transmitter (e.g. constructed from FPGA/DSP, suitable transmitter processors, and transmitter according to the methods of Harris or other methods). As before, these various OTFS wireless transmitter devices will have their respective locations and velocities, and each will typically be configured to automatically wirelessly transmit various symbols through space (e.g. the multi-dimensional data channel, with its associated wireless reflectors, and channel response parameters) to one or more wireless OTFS receiver devices. These wireless OTFS receivers will also each have their own respective locations and velocities.

More specifically, as previously discussed, the OTFS transmitter devices will generally comprise at least one processor (often one or more microprocessors or digital signal processors), memory, and least one processor-controlled wireless transmitter component configured to transmit a plurality of wireless signals simultaneously at a plurality of frequencies. As previously discussed, the processor(s) and transmitter(s) are often configured to spread each OTFS symbol in the plurality of OTFS symbols throughout a plurality of mutually orthogonal time shifted and frequency shifted wireless OTFS waveform bursts, and then use the antenna(s) to transmit these bursts. In some embodiments, the transmitter may further transmit various error detection/correction symbols, pilot signals, polarization schemes, and use various MIMO methods and other methods described previously. The transmitter may also further vary the range of OTFS time shifts and frequency shifts, duration of the burst length, burst bandwidth, and other characteristics as described previously. Often the transmitter may have one or more associated wireless receivers, which may be OTFS wireless receivers or other type wireless receiver, configured to receive signals originating from other OTFS transmitters operating in conjunction with distant OTFS receiver devices, and use information obtained from these other OTFS transmitters to adjust the various aspects of transmitter operation described previously.

Thus the basic transmitter scheme can then be supplemented by various combinations and permutations of the various methods described previously in this disclosure.

Methods of Operating OTFS Receivers

Similarly, it should also be evident that the various methods and systems described herein, which apply to wireless OTFS transmitters, wireless OTFS receivers, and methods in which wireless OTFS receivers and wireless OTFS transmitters can cooperate to improve signal transmission between the transmitters, thus of course also apply to methods of operating one or more OTFS wireless receivers, as well as the receiver devices themselves.

In general, at the receiver level, the invention thus covers various methods of designing, configuring, constructing, and operating one or more OTFS wireless receiver devices.

As a common denominator, the basic receiver method, which can also then be extended and elaborated upon according to the previously described embodiments, can be a method of operating at least one OTFS wireless receiver device. As before, these receiver devices will generally each have their own respective device locations and velocities, and will also generally be configured to automatically wirelessly receive a plurality of symbols transmitted through a multi-dimensional data channel from one or more of the previously described OTFS wireless transmitter devices (which of course have their own various locations and velocities). The OTFS receivers will then decode these symbols after the waveforms have been distorted by the previously described reflectors (which can have locations, velocities, and one or more coefficients, parameters, or operators of wireless reflection) and channel response parameters.

Thus, as previously described, the OTFS wireless waveform bursts travel over at least one path to the receiver (e.g. at least one of a: originally transmitted wireless OTFS waveform bursts traveling directly from the wireless transmitter(s) to the OTFS wireless receiver device(s) as direct wireless OTFS waveform bursts; and/or b: originally transmitted OTFS waveform bursts reflecting off the wireless reflector(s) before reaching the OTFS wireless receiver device(s) thereby producing time delayed and Doppler frequency shifted reflected wireless OTFS waveform bursts at the OTFS wireless receiver device(s), thus producing, at the receiver, a combination of these direct bursts and any said reflected bursts thus producing the channel convoluted OTFS waveform bursts described previously).

Here as before, the channel response parameters of the multi-dimensional data channel are determined by at least the relative positions, relative velocities, and properties of the wireless transmitter device(s), OTFS wireless receiver device(s), and wireless reflector(s).

To handle this, the OTFS wireless receiver will typically comprise at least one processor-controlled wireless receiver component configured to receive wireless signals at a plurality of frequencies, at least one processor, memory, and at least one antenna. The wireless receiver component can be a software configured receiver (e.g. constructed from FPGA/DSP, suitable receiver processors, and receiver software according to the methods of Harris or other methods), or other type receiver.

The receiver device's processor will often be configured (often with suitable software), to use the wireless receiver components, antenna(s) and memory to receive the convoluted OTFS waveform bursts, and determine the channel response parameters. In some embodiments, this may be assisted by the error detection/correction methods, pilot signal methods, MIMO methods and other methods described previously.

Typically at least one receiver device processor will be further configured (often using software) to use these channel response parameters to compute suitable deconvolution parameters, and use these deconvolution parameters to then deconvolute the channel convoluted OTFS waveform bursts. This results in at least an approximation (ideally a very good approximation) of the originally transmitted OTFS waveform bursts. Then at least one receiver device processor will usually then mathematically extract (or otherwise solve for) the various originally transmitted OTFS symbols from this approximation of the original signals, and thus the various originally transmitted OTFS symbols that contain the data payload will then be received.

If the remote OTFS transmitter transmitting to the receiver has transmitted various error detection/correction symbols, pilot signals, or used various MIMO methods and other methods described previously to communicate with the OTFS receiver, then often the OTFS receiver will be further configured to use these methods to improve performance as described previously. If the remote OTFS transmitter has varied the range of OTFS time shifts and frequency shifts, duration of the burst length, burst bandwidth, polarization schemes and other characteristics as described previously, then often the OTFS receiver will be configured to work with or compensate for these changes.

Often the OTFS receiver will be a transceiver with one or more of its own associated wireless transmitters, which may be OTFS wireless transmitters or other type wireless transmitters, configured to transmit signals to other OTFS receivers operating in conjunction with distant OTFS transmitter devices (i.e. the distant OTFS transmitters will often also be transceivers). The OTFS receiver may use its own transmitters to transmit information and suggestions to the distant OTFS transmitter devices to adjust various aspects of the remote OTFS transmitter operation as described previously.

Regarding Optimizing OTFS Settings to Fit the Situation at Hand

The most common applications of the invention will be on Earth, usually at regions near the ground, where there will be a breathable amount of air, and other natural atmospheric phenomenon such as clouds, rain, and hail. For many wireless frequencies, radio waves pass through this natural atmospheric phenomenon with little interference, and thus often the effects of the intervening air and natural atmospheric phenomenon can be ignored. For higher frequency radio signals, this natural phenomenon can be treated by the system as sources of additional wireless signal attenuation or additional wireless reflectors as the case may be.

As previously discussed, the most common applications of the invention will also often be in either urban or rural environments on Earth or near earth, where relevant reflectors (e.g. various buildings, natural or artificial structures, vehicles and the like) can be assumed to have certain geometries, and spacing, as well as to operate within certain assumes ranges of speeds (e.g. generally 0-100 miles per hour for vehicles, between 0-1000 miles per hour for airplanes, and the like). To some extent, these assumptions may be used to fine-tune various parameters (e.g. various burst lengths, time shifts, frequency shifts and the like) that will be discussed shortly. Conversely, a version of the invention designed to operate in a very different environment, such as for commercial or military aviation at higher altitudes, or in orbit or outer space, may have various parameters that are fine-tuned to cope with a much broader range of potential velocities distances, and reflector spacing.

Combining Previously Discussed Methods to Produce a High Performance System

Figure 7:
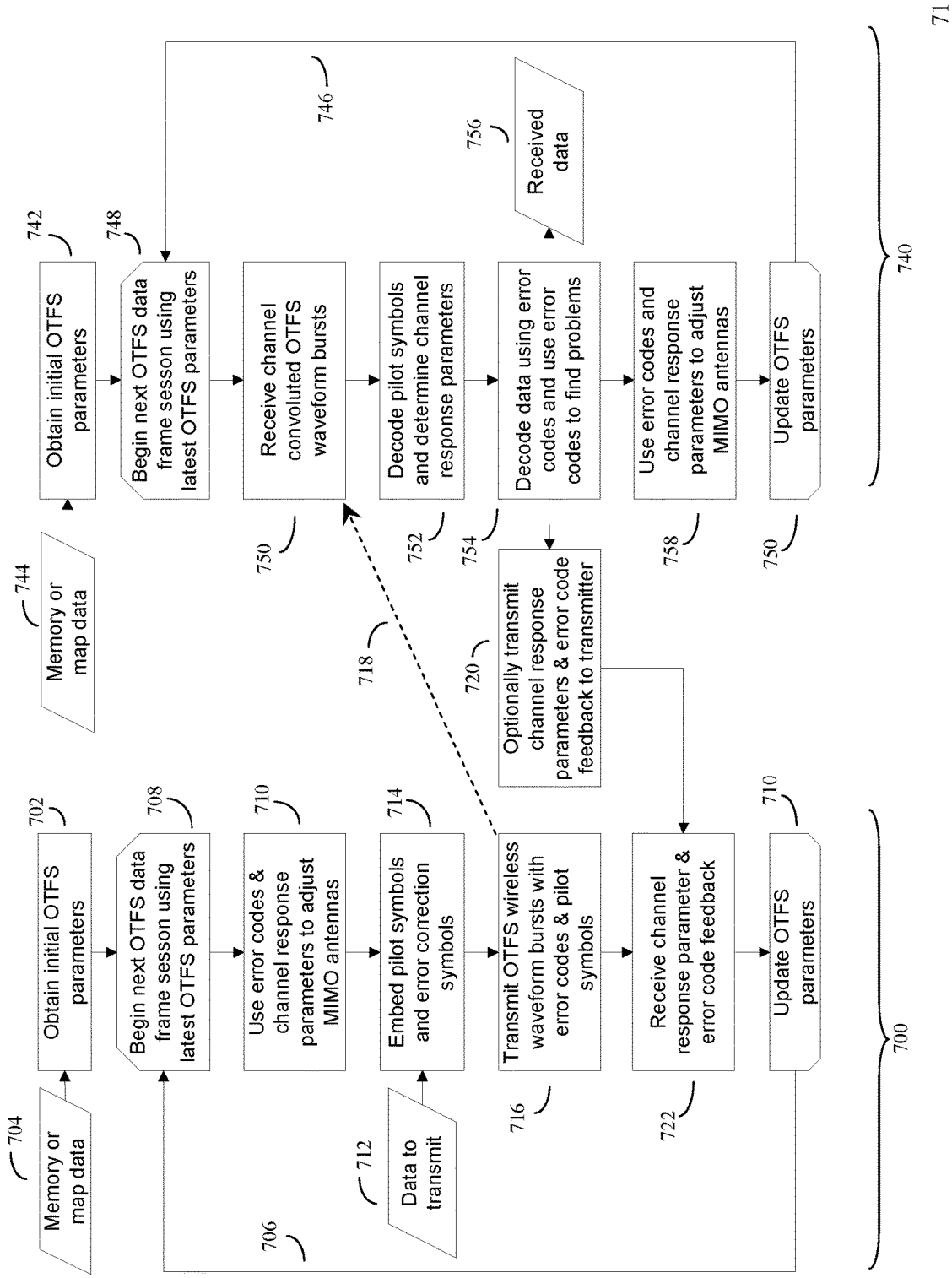
FIG. 7 shows how the various embodiments of the invention—OTFS transmitters, OTFS receivers, modifying OTFS time shifts, frequency shifts, polarization, burst characteristics, use of error codes, pilot symbols, MIMO antennas, maps of channel response parameters and the like can all work together, either all combined, or with only some embodiments implemented, to produce a unified OTFS wireless communications system designed to provide robust and fade resistant communications even when operating in a difficult and constantly changing environment.

FIG. 7 shows how the various embodiments of the invention—OTFS transmitters (e.g. 102, 102*m*, 700), OTFS receivers (e.g. 104, 104*m*, 740), and the previously discussed schemes, such as OTFS time shifts, frequency shifts, polarization, burst characteristics, use of error codes, pilot symbols, polarization schemes, MIMO antennas, maps of channel response parameters and the like can all work together, either all combined, or with various permutations of various specific methods, to produce a unified OTFS wireless communications system designed to provide robust and fade resistant communications even when operating in a difficult and constantly changing environment.

FIG. 7 can best be understood as a software flow chart showing one embodiment by which OTFS transmitter processors and OTFS receiver processors can vary essentially any and all of the previously discussed modes of operation, in almost any combination, in order to dynamically optimize OTFS wireless transmissions, even within a single communications session.

For example, consider how an OTFS transmitter, such as (102 or 102*m*), can be controlled at the software level (700) using, for example, one or more OTFS transmitter processors and suitable control software. At the beginning of a wireless OTFS communications session, the OTFS transmitter may use its processor to obtain initial OTFS parameters, such as an initial set of OTFS channel response parameters (702) from various sources including the transmitter's memory and/or the previously described local or remote map database (704) (e.g. the transmitter can wirelessly transmit its GPS location to a remote map server, and receive back various location specific OTFS parameters such as an initial set of channel response parameters). The OTFS transmitter can then use this initial set of OTFS parameters to start OTFS wireless transmissions to OTFS receiver (104, 104*m*, 740). OTFS receiver (104, 104*m*, 740) can also initialize its initial set of OTFS parameters (742) using similar receiver memory and/or map server methods (744). Here of course, for such GPS assisted mapping schemes to be used, the device, be it OTFS transmitter and or OTFS receiver, will have GPS units or other location determination circuits.

In this example, for simplicity, assume that the transmitter (transmitter processor) is configured (e.g. often by software) to be able to change various OTFS transmission variables on a per data frame method, but usually not within a data frame. (Other schemes with finer granularity, e.g. changes in various OTFS transmission variables at a finer level within an OTFS data frame, can also be used.)

After initialization, the OTFS transmitter software (700) can enter in a transmission loop (706), (708), (710). This loop will typically progress in various iterations as multiple data frames are transmitted until all data frames in a communications session have been transmitted. In particular, the transmitter can start the first iteration of loop (708) by configuring the various OTFS modulation schemes and burst characteristics as best it can with available data (e.g. the latest OTFS parameters).

Next (710), in this example on a per data frame basis, the OTFS transmitter processor and software (700) can set up various error code schemes appropriate for the situation at hand, as well as use available information to adjust the settings of any transmitter MIMO antennas (110*a*-110*d*). Typically as the communication session continues over multiple data frames, these various settings become further optimized for the particular data channel conditions.

The wireless OTFS transmitter is now ready to start this iteration's task of packaging the actual useful data (e.g. payload) (712) for transmission. To do this, the transmitter processor and software (700) can embed the payload data along with various pilot symbols and error correction symbols into suitable OTFS data frames (714), and then modulate and transmit (716). The originally transmitted wireless OTFS waveform bursts (718) travel to the wireless OTFS receiver (104, 104*m*) along various direct OTFS waveform burst paths (e.g. 112) and various reflected OTFS waveform burst paths (e.g. 114*a*, 114*b*), and are eventually received by the receiver and handled by receiver software (740).

In many embodiments, OTFS wireless transmitter (102, 102*m*) will have its own receiver, which may be an OTFS wireless receiver, but which can also be other types of receivers. Assuming that this transmitter is also equipped with its own local wireless receiver, and that OTFS receiver (104, 104*m*) is also equipped with its own local transmitter, then in some optional embodiments, OTFS transmitter (700) can also receive channel response parameter feedback and error code feedback (720) from OTFS receiver software (740) and receiver (102, 102*m*) and handle this according to transmitter's software (722). The OTFS transmitter software (700) and associated hardware can then use whatever information it has accumulated to update the various previously discussed OTFS transmitter parameters (710), and in the next iteration, the transmission loop (706, 708, 710) can then transmit the next data frame with either the same set of transmission variables or different transmission variables as conditions warrant. This process again will generally be done by at least one transmitter processor and suitable software.

The OTFS receiver side of the process generally performs the counterpart of the previously discussed OTFS transmitter functions. The receiver (104, 104*m*) will also generally be under the control of at least one receiver processor and receiver software (740). Receiver software (740) and associated receiver hardware may also initialize the receiver's reception of wireless OTFS data frames by first retrieving (742) suitable initial OTFS parameters from either the receiver's memory (744) and/or by using the previously described receiver memory and/or map server methods (744).

The OTFS receiver software (740) and associated hardware can then enter into its own receiver loop (746, 748, 750) iterations. In this example, for simplicity, assume that the OTFS receiver (receiver processor) is configured (e.g. often by suitable receiver software 740) to be able to change its various OTFS reception variables on a per-data-frame basis as well (or other schemes as desired). (As with the transmitter, other receiver schemes with finer granularity, e.g. changes in various OTFS transmission variables at a finer level within an OTFS data frame, can also be used.)

The OTFS receiver will receive (often on a per data frame basis) the now channel convoluted OTFS waveform bursts (718) which are the combination of any direct wireless OTFS waveform bursts (112, 112a) and any reflected wireless OTFS waveform bursts (114b). The receiver will then use its one or more processors and software (740) to decode any pilot signals that the transmitter may have embedded in the transmitted signals (752), and otherwise determine the channel response parameters of the multi-dimensional data channel at that time. The receiver can then use these channel response parameters and, with suitable error code and correction, decode the data payload (754) and this received data (756) can be stored in memory or output for subsequent use.

If the receiver (104, 104m) has its own local transmitter, the receiver software (740) and processor can direct the receiver's local transmitter to transmit information pertaining to the receiver determined channel response parameters other information, such as error code feedback, receiver MIMO settings and capability (if any) to the transmitter (102, 102m) where it can be received by the transmitter's local receiver and interpreted by the transmitter's software (720). Thus if the transmitter has its own local receiver, the transmitter can use its local receiver to receive this data and use it to refine its own settings for subsequent transmitted data frames.

The receiver software (740) and processor can also use information derived from the channel response parameters and error codes to determine how to best refine the adjustment of its various MIMO antennas (if any) for receiving the next data frame (758).

Many other OFTS receiver and transmitter operating schemes are also possible. The main purpose of FIG. 7 is to give one specific example of how the various methods disclosed herein may be combined (in various combinations, and not all methods need be used) to produce a robust and high performance wireless communication system.

Further Discussion of GPS Techniques:

Note further that GPS or other location determination techniques may also be used for other purposes, such as helping to better determine time synchronization between the transmitter and receiver. Here for example, by knowing the relative locations of the transmitter and receiver, the distance between the transmitter and receiver can thus be determined. By making use of fundamental constants, such as the speed of light, the effect of transmission delay on timing can thus be automatically determined, and this transmission timing delay can thus be used for more accurate timing synchronization throughout the system.

Further Details of OTFS Waveform Structure and OTFS Burst Structure

A variety of methods may be used to generate OTFS waveforms. Here the main criteria is that each data symbol is distributed, in a lossless and invertible manner, across a plurality of distinguishable (e.g. usually mutually orthogonal) waveforms over a plurality of different times and different frequencies chosen according to the time delay and Doppler-shift channel response parameters of the wireless multi-dimensional data channel.

In some embodiments, the OTFS waveforms may be produced and structured according to methods previously discussed in U.S. patent application Ser. Nos. 61/349,619, 13/177,119, 13/430,690 and as well as U.S. Pat. No. 8,547,988; the complete contents of which are incorporated herein by reference in their entirety. Some specific examples of some of these embodiments are discussed below.

In some embodiments, at the transmitter end, a microprocessor controlled transmitter may package a series of different symbols "d" (e.g. $d_1, d_2, d_3 \ldots$) for transmission by repackaging or distributing the symbols into various elements of various N·N matrices [D] by, for example assigning $d_1$ to the first row and first column of the [D] matrix (e.g. $d_1=d_{0,0}$), $d_2$ to the first row second column of the [D] matrix (e.g. $d_2=d_{0,1}$) and so on until all N·N symbols of the [D] matrix are full. Here, once we run out of d symbols to transmit, the remaining [D] matrix elements can be set to be 0 or other value indicative of a null entry.

The various primary waveforms used as the primary basis for transmitting data, which here will be called "tones" to show that these waveforms have a characteristic sinusoid shape, can be described by an N·N Inverse Discrete Fourier Transform (IDFT) matrix [W], where for each element w in [W], $$w_{j,k} = e^{\frac{i2\pi jk}{N}}$$

or alternatively $w_{j,k}=e^{ij\Theta_k}$ or $$w_{j,k} = [e^{i\theta_k}]^j.$$

Thus the individual data elements d in [D] are transformed and distributed as a combination of various fundamental tones w by a matrix multiplication operation [W]*[D], producing a tone transformed and distributed form of the data matrix, here described by the N·N matrix [A], where [A]=[W]*[D].

To produce the invention's N time shifted and N frequency shifted waveforms, the tone transformed and distributed data matrix [A] is then itself further permuted by modular arithmetic or "clock" arithmetic, creating an N·N matrix [B], where for each element of b of [B], $b_{i,j}=a_{i,(i+j) \bmod N}$. This can alternatively be expressed as [B]=Permute([A])=P(IDFT*[D]). Thus the clock arithmetic controls the pattern of time and frequency shifts.

A unitary matrix [U] can then be used to operate on [B], producing an N·N transmit matrix [T], where [T]=[U]*[B], thus producing a $N^2$ sized set of all permutations of N time shifted and N frequency shifted waveforms determined according to an encoding matrix [U]. Put alternatively, the N·N transmit matrix [T]=[U]*P(IDFT*[D]).

Then, typically on a per column basis, each individual column of N is used to further modulate a frequency carrier wave (e.g. if we are transmitting in a range of frequencies around 1 GHz, the carrier wave will be set at 1 GHz), and each column the N·N matrix [T] which has N elements, thus produces N symbol-weighted time shifted and frequency shifted waveforms for each data symbol. Effectively then, the transmitter is transmitting the sum of the N symbol-weighted time shifted and frequency shifted waveforms from one column of [T] at a time as, for example, a composite waveform over a time block of data. Alternatively the transmitter could instead use a different frequency carrier wave for the different columns of [T], and thus for example transmit one column of [T] over one frequency carrier wave, and simultaneously transmit a different column of [T] over a different frequency carrier wave, thus transmitting more data at the same time, although of course using more bandwidth to do so. This alternative method of using different frequency carrier waves to transmit more than one column of [T] at the same time will be referred to as frequency blocks, where each frequency carrier wave is considered its own frequency block.

Thus, since the N·N matrix [T] has N columns, the transmitter will transmit the $N^2$ summation-symbol-weighted time shifted and frequency shifted waveforms, structured as N composite waveforms, over any combination of N time blocks or frequency blocks.

On the receiver side, the transmit process is essentially reversed. Here, for example, a microprocessor controlled receiver would of course receive the various columns [T] (e.g. receive the N composite waveforms, also known as the N symbol-weighted time shifted and frequency shifted waveforms) over various time blocks or frequency blocks as desired for that particular application. If for example there is a lot of available bandwidth and time is of the essence, then the transmitter will transmit, and the receiver will receive, the data as multiple frequency blocks over multiple frequency carrier waves. On the other hand, if available bandwidth is more limited, and/or time (latency) is less critical, then the transmit will transmit and the receiver will receive over multiple time blocks instead.

So effectively the receiver tunes into the one or more frequency carrier waves, and over the number of time and frequency blocks set for that particular application eventually receives the data or coefficients from original N·N transmitted matrix [T] as an N·N receive matrix [R] where [R] is similar to [T], but may not be identical due to various communications impairments.

The microprocessor controlled receiver then reverses the transmit process as a series of steps that mimic, in reverse, the original transmission process. The N·N receive matrix [R] is first decoded by inverse decoding matrix $[U^H]$, producing an approximate version of the original permutation matrix [B], here called $[B^R]$, where $[B^R]=([U^H]*[R])$.

The receiver then does an inverse clock operation to back out the data from the time shifted and frequency shifted waveforms (or tones) by doing an inverse modular mathematics or inverse clock arithmetic operation on the elements of the N·N $[B^R]$ matrix, producing, for each element $b^R$ of the N·N $[B^R]$ matrix, $a_{i,j}^R = b_{i,(j-i) \mod N}^R$. This produces a "de-time shifted and de-frequency shifted" version of the tone transformed and distributed form of the data matrix [A], here called $[A^R]$. Put alternatively, $[A^R]$=Inverse Permute $([B^R])$, or $[A^R]=P^{-1}([U^H]*[R])$.

The receiver then further extracts at least an approximation of the original data symbols d from the $[A^R]$ matrix by analyzing the [A] matrix using an N·N Discrete Fourier Transform matrix DFT of the original Inverse Fourier Transform matrix (IDFT).

Here, for each received symbol $d^R$, the $d^R$ are elements of the N·N received data matrix $[D^R]$ where $[D^R]=DFT*A^R$, or alternatively $[D^R]=DFT*P^{-1}([U^H]*[R])$.

Thus the original $N^2$ summation-symbol-weighted time shifted and frequency shifted waveforms are subsequently received by a receiver which is controlled by the corresponding decoding matrix $U^H$ (also represented as $[U^H]$) The receiver (e.g. the receiver's microprocessor and associated software) uses this decoding matrix $[U^H]$ to reconstruct the various transmitted symbols "d" in the one or more originally transmitted N·N symbol matrices [D] (or at least an approximation of these transmitted symbols).

Alternatively, in some in some embodiments, these "tones" may be narrow-band subcarriers, such as OFDM subcarriers. Alternative encoding and decoding schemes may be used so that, for example, an N×M data matrix can be transmitted over M narrow-band subcarriers over N time periods.

There are several ways to correct for distortions caused by the signal impairment effects of echo reflections and frequency shifts. One way is, at the receiver front end, utilize the fact that the time shifted and frequency shifted waveforms or "tones" form a predictable time-frequency pattern, and a "dumb" deconvolution device situated at the receiver's front end can recognize these patterns, as well as the echo reflected and frequency shifted versions of these patterns, and perform the appropriate deconvolution by a pattern recognition process. Alternatively the distortions may be mathematically corrected by the receiver's software, here by doing suitable mathematical transformations to essentially determine the echo reflected and frequency shifting effects, and solve for these effects. As a third alternative, once, by either process, the receiver determines the time and frequency deconvolution parameters of the communication media's particular time and frequency distortions, the receiver may transmit a command to the transmitter to instruct the transmitter to essentially pre-compensate or pre-encode for these effects. That is, if for example the receiver detects an echo, the transmitter can be instructed to transmit in a manner that offsets this echo, and so on.

Echo reflections and frequency shifts can blur or impair or distort a transmitted signal by inducing additive noise. These distortions can be modeled as a 2-dimensional filter acting on the data array. This filter represents, for example, the presence of multiple echoes with time delays and Doppler shifts. To reduce these distortions, the signal can either be pre-equalized before receiver subsequent receiver processing, or alternatively post-equalized after the $D^R$ matrix has been recovered. This equalization process may be done either by analog or digital methods. The equalized form of the received D matrix, which ideally will completely reproduce the original D matrix, is termed $D_{eq}$.

In some embodiments, an adaptive linear equalizer may be used to correct for such distortions. This adaptive linear equalizer can function at either step, optionally as a more analog method or step, but more generally as a more digital and mathematical process.

The equalizer may, in some embodiments operate according to a function such as:

$$Y(k) = \sum_{L=Lc}^{Rc} C(l)^* X(k-l) + \eta(k).$$

In other embodiments, channel response parameters obtained by use of OTFS pilot symbols (see FIGS. 2 and 3 and related discussion may alternatively or additionally be used to assist in this equalization (deconvolution) process.

The invention claimed is:
1. A system comprising:
at least one software configured wireless transmitter configured to wirelessly transmit a plurality of symbols to at least one software configured wireless receiver through a multi-dimensional data channel connecting said at least one wireless transmitter to said at least one wireless receiver;

said multi-dimensional data channel comprising at least two dimensions of space and one dimension of time;

said multi-dimensional data channel further comprising at least one wireless reflector, each said at least one wireless reflector comprising a reflector location, velocity, and at least one coefficient of wireless reflection;

each said at least one wireless transmitter further comprising a wireless transmitter location and velocity, and at least one transmitter processor;

each said at least one wireless receiver further comprising a wireless receiver location and velocity, and at least one receiver processor;

said at least one transmitter processor configured to transmit, at least for said symbols that comprise data symbols, and where there are a plurality of such data symbols, said data symbols as originally transmitted wireless waveform bursts;

wherein upon propagation through said multi-dimensional data channel, said originally transmitted wireless waveform bursts travel over at least one path, said at least one path, comprising at least one of:

a: originally transmitted wireless waveform bursts traveling directly from said at least one wireless transmitter to said at least one wireless receiver as direct wireless waveform bursts; and/or b: originally transmitted waveform bursts reflecting off of said at least one wireless reflector before reaching said at least one wireless receiver, thereby producing time delayed and Doppler frequency shifted reflected wireless waveform bursts at said at least one wireless receiver;

wherein at said at least one wireless receiver, a resulting combination of any said direct wireless waveform bursts and any said reflected wireless waveform bursts produces channel convoluted waveform bursts;

said at least one wireless receiver configured to receive said channel convoluted waveform bursts by using said at least one receiver processor to determine channel response parameters of said multi-dimensional data channel between said at least one wireless transmitter and said at least one wireless receiver, wherein said channel response parameters of said multi-dimensional data channel are created by at least relative positions, relative velocities, and properties of said at least one wireless transmitter, said at least one wireless receiver, and said at least one wireless reflector;

said at least one receiver processor further configured to use said channel response parameters to deconvolute received channel convoluted waveform bursts, thereby deriving at least an approximation of said originally transmitted waveform bursts;

said at least one receiver processor further configured to extract said plurality of data symbols from said approximation of said originally transmitted waveform bursts, thereby receiving at least some of said data symbols transmitted between said at least one wireless transmitter and at least one wireless receiver.

2. The system of claim 1, wherein said at least one transmitter is further configured to use said at least one transmitter processor to transmit at least one pilot symbol as at least one wireless pilot symbol waveform burst at at-least one defined time and frequency;

wherein the direct and reflected versions of said at least one wireless pilot symbol waveform burst reach said at least one wireless receiver as at least one channel convoluted pilot symbol waveform burst;

said at least one wireless receiver further configured to receive said at least one channel convoluted pilot symbol waveform burst, and use said at least one receiver processor to determine the channel response parameters of said multi-dimensional data channel connecting said at least one wireless transmitter and at least one wireless receiver, and to subsequently use said channel response parameters to further deconvolute the received channel convoluted waveform bursts.

3. The system of claim 1, wherein at least some of said symbols comprise error detection or error correction symbols;

said at least one receiver processor further configured to use said error detection or error correction symbols to detect when symbol transmission errors exceed a predetermined acceptable error level, and to automatically inform said receiver or said transmitter that said channel response parameters are suboptimum, and to initiate corrective action; and/or said at least one receiver processor further configured to use said error detection or error correction symbols to automatically correct errors in other data symbols.

4. The system of claim 1, wherein at least one of said wireless transmitter and said wireless receiver further comprise multiple antennas, said multiple antennas positioned at different locations on or near said at least one wireless transmitter and said wireless receiver, and said multiple antennas sharing the same velocity of their respective wireless transmitter or wireless receiver;

at least one of said wireless transmitter and said wireless configured further configured to use said multiple antennas to perform at least one of further determining said channel response parameters and shaping at least a spatial distribution of said transmitted or received wireless waveform bursts.

5. The system of claim 1, wherein at least one of said wireless transmitter and said wireless receiver further comprise multiple antennas, said multiple antennas positioned at different locations on or near said at least one wireless transmitter and said wireless receiver, and said multiple antennas sharing the same velocity of their respective wireless transmitter or wireless receiver;

wherein said multiple antennas are divided into at least a first subset of antennas and a second subset of antennas;

and said first subset of said multiple antennas is configured to transmit or receive a first set of wireless waveform bursts that differs from a second set of wireless waveform bursts transmitted or received by said second subset of antennas.

6. The system of claim 1, wherein at least one of said wireless transmitter and said wireless receiver are configured in a first full duplex device, and wherein at least one of said wireless transmitter and said wireless receiver are configured in a second full duplex device;

at least said first full duplex device further configured to control coupling between said first full duplex device's at least one wireless transmitter and said first full duplex device's at least one wireless receiver so as to mitigate interference between said first full duplex device's at least one wireless transmitter and said first full duplex device's at least one wireless receiver while transmitting to said second full duplex device, said first full duplex device also configured to simultaneously also optimize a sensitivity of said first full duplex device's at least one wireless receiver while receiving from said second full duplex device's at least one wireless transmitter;

wherein said first full duplex device is also configured to control said controlling coupling by also configuring said first full duplex device to obtain self-channel response parameters of waveform bursts or pilot symbol waveform bursts traveling between said first full duplex device's at least one wireless transmitter and said first full duplex device's at least one wireless receiver; and said first full duplex device's at least one processor and said self-channel response parameters are further configured to digitally mitigate said interference.

7. The system of claim 1, wherein said at least one transmitter is configured to transmit polarized originally transmitted waveform bursts or pilot symbol waveform bursts according to at least one direction of polarization;

said at least one wireless reflector is a polarization altering wireless reflector that alters the polarization of said time delayed and Doppler frequency shifted reflected wireless waveform bursts or pilot symbol waveform bursts according to a first reflector polarization operator;

said at least one receiver is further configured to detect at least one direction of polarization in said received convoluted waveform bursts or pilot symbol waveform bursts;

wherein when said originally transmitted waveform bursts or pilot symbol waveform bursts reflect off of said at least one wireless reflector, at least some of said originally transmitted waveform bursts or pilot symbol waveform bursts are also polarization shifted according to said first reflector polarization operator;

said at least one receiver further configured to use said at least one direction of polarization in said received channel convoluted waveform bursts or pilot symbol waveform bursts to further determine the channel response parameters of said multi-dimensional data channel.

8. The system of claim 1, wherein said system further comprises a map database of the channel response parameters of said multi-dimensional data channel at a plurality of transmitter and receiver locations;

said at least one wireless transmitter and said at least one wireless receiver configured to determine their respective positions, said at least one wireless transmitter and said at least one wireless receiver further configured to use said positions of said at least one wireless transmitter and said at least one wireless receiver to search said map database and retrieve at least some channel response parameters of said multi-dimensional data channel at said positions of said at least one wireless transmitter and/or said at least one wireless receiver.

9. A system comprising at least one wireless transmitter device, each said at least one wireless transmitter device having a wireless transmitter device location and velocity, each said at least one wireless transmitter device configured to automatically wirelessly transmit a plurality of symbols through a multi-dimensional data channel to at least one wireless receiver device with a wireless receiver device location and velocity;

said multi-dimensional data channel comprising at least two dimensions of space and one dimension of time;

wherein said at least some of said plurality of symbols comprise a plurality of data symbols;

said multi-dimensional data channel further comprising at least one wireless reflector, each said at least one wireless reflector comprising a reflector location, velocity, and at least one coefficient of wireless reflection;

wherein channel response parameters of said multi-dimensional data channel are determined by at least relative positions, relative velocities, and said coefficients of wireless reflection of each said at least one wireless transmitter device, said at least one wireless receiver device, and said at least one wireless reflector;

each said at least one transmitter device comprising:

at least one processor, memory, at least one processor-controlled wireless transmitter component configured to transmit wireless signals at a plurality of frequencies, and at least one antenna; and said at least one transmitter device further configured to use said at least one antenna to wirelessly transmit said symbols as wireless waveform bursts, thereby producing originally transmitted wireless waveform bursts.

10. The system of claim 9, wherein said at least one wireless transmitter device is configured to at least initially determine said channel response by retrieving said channel response parameters from memory; and wherein said at least one wireless transmitter device is further configured to determine subsequent channel response parameters based at least partially upon feedback obtained from a wireless receiver that has received said transmitted symbols.

11. A system comprising at least one wireless receiver device, each said at least one wireless receiver device comprising a wireless receiver device location and velocity, each said at least one wireless receiver device configured to automatically wirelessly receive a plurality of symbols transmitted through a multi-dimensional data channel by least one wireless transmitter device with a wireless transmitter device location and velocity;

wherein at least some of said plurality of symbols comprise a plurality of data symbols, previously transmitted as a plurality originally transmitted wireless waveform bursts;

said multi-dimensional data channel comprising at least two dimensions of space and one dimension of time;

said multi-dimensional data channel further comprising at least one wireless reflector, each said at least one wireless reflector comprising a reflector location, velocity, and at least one coefficient of wireless reflection;

wherein upon propagation through said multi-dimensional data channel, said originally transmitted wireless waveform bursts travel over at least one path, said at least one path, comprising at least one of:

a: originally transmitted wireless waveform bursts traveling directly from said at least one wireless transmitter to said at least one wireless receiver device as direct wireless waveform bursts; and/or b: originally transmitted waveform bursts reflecting off of said at least one wireless reflector before reaching said at least one wireless receiver device, thereby producing time delayed and Doppler frequency shifted reflected wireless waveform bursts at said at least one wireless receiver device;

wherein at said at least one wireless receiver device, a resulting combination of any said direct wireless waveforms bursts and any said reflected wireless waveform bursts produces channel convoluted waveform bursts;

wherein channel response parameters of said multi-dimensional data channel are determined by at least relative positions, relative velocities, and properties of said at least one wireless transmitter device, said wireless receiver device, and said at least one wireless reflector;

said wireless receiver device comprising:

at least one processor-controlled wireless receiver component configured to receive wireless signals at a plurality of frequencies, at least one processor, memory, and at least one antenna;

said at least one processor configured to use said at least one wireless receiver component, at least one antenna, and memory to receive said convoluted waveform bursts or pilot symbol waveform bursts, and determine channel response parameters;

said at least one processor further configured to use said channel response parameters and said memory to deconvolute received channel convoluted waveform bursts, thereby deriving at least an approximation of said originally transmitted waveform bursts;

said at least one processor further configured to use said memory to extract said plurality of data symbols from said approximation of said originally transmitted waveform bursts, thereby receiving said plurality of data symbols.

12. The system of claim 11, wherein said wireless receiver device is further configured to retrieve previously stored channel response parameters from memory, and to use said previously stored channel response parameters to at least initially determine said channel response parameters; and wherein said wireless receiver device is further configured to transmit feedback pertaining to said channel response parameters to a transmitter that has transmitted said plurality of symbols.

\* \* \* \* \*